United States Patent
Wang et al.

(10) Patent No.: US 11,659,521 B2
(45) Date of Patent: May 23, 2023

(54) LONG PHYSICAL SIDELINK SHARED CHANNEL FORMAT FOR SIDELINK COMMUNICATION

(71) Applicant: QUALCOMM Incorporated, San Diego, CA (US)

(72) Inventors: Xiaojie Wang, Hillsborough, NJ (US); Xiaoxia Zhang, San Diego, CA (US); Piyush Gupta, Bridgewater, NJ (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/105,329

(22) Filed: Nov. 25, 2020

(65) Prior Publication Data

US 2022/0167310 A1    May 26, 2022

(51) Int. Cl.
*H04W 72/02* (2009.01)
*H04B 7/06* (2006.01)
(Continued)

(52) U.S. Cl.
CPC .......... *H04W 72/02* (2013.01); *H04B 7/0626* (2013.01); *H04L 1/0003* (2013.01);
(Continued)

(58) Field of Classification Search
CPC ... H04L 5/0051; H04L 5/0053; H04L 5/0094; H04L 27/2602; H04L 27/2607;
(Continued)

(56) References Cited

U.S. PATENT DOCUMENTS

2020/0022089 A1* 1/2020 Guo .................... H04W 52/346
2020/0413431 A1* 12/2020 Park ..................... H04L 1/0003
(Continued)

FOREIGN PATENT DOCUMENTS

WO    WO-2020166280 A1 *  8/2020  ............ H04W 72/04

OTHER PUBLICATIONS

Apple: "Discussion on Sidelink Power Consumption Model", 3GPP Draft, R1-2008445, 3GPP TSG RAN WG1 #103-e, 3rd Generation Partnership Project (3GPP), vol. RAN WG1, No. e-Meeting, Oct. 26, 2020-Nov. 13, 2020, Oct. 24, 2020 (Oct. 24, 2020), XP051946665, 4 Pages, Retrieved from the Internet: URL:https://ftp.3gpp.org/tsg_ran/WG1_RL1/TSGR1_103-e/Docs/R1-2008445.zip R1-2008445 Discussion on Sidelink Power ConsumptionModel.docx [retrieved on Oct. 24, 2020] p. 3.
(Continued)

*Primary Examiner* — Phuc H Tran
(74) *Attorney, Agent, or Firm* — Procopio, Cory, Hargreaves & Savitch LLP/Qualcomm Incorporated

(57) ABSTRACT

Aspects presented herein may enable a sidelink device to report or to receive HARQ feedback for sidelink channels based on a long PSFCH format. In one aspect, an apparatus transmits, to a second UE, an indication to provide HARQ feedback for at least one sidelink channel. The apparatus transmits, to the second UE, the at least one sidelink channel. The apparatus receives, from the second UE, an ACK or a NACK for the at least one sidelink channel via a PSFCH, the PSFCH including a long PSFCH format and associated with a sidelink resource pool.

28 Claims, 21 Drawing Sheets

(51) Int. Cl.
  *H04L 1/00* (2006.01)
  *H04L 1/1812* (2023.01)
  *H04L 1/1829* (2023.01)
  *H04L 5/00* (2006.01)
  *H04W 72/04* (2023.01)
  *H04W 72/0446* (2023.01)

(52) U.S. Cl.
  CPC .......... *H04L 1/1819* (2013.01); *H04L 1/1854* (2013.01); *H04L 5/0055* (2013.01); *H04W 72/0406* (2013.01); *H04W 72/0446* (2013.01)

(58) Field of Classification Search
  CPC ............. H04L 27/2613; H04L 27/2636; H04L 5/0007; H04L 5/0044; H04L 5/0048; H04L 1/0067; H04L 1/1819; H04L 1/1854; H04L 1/188; H04L 1/1887
  See application file for complete search history.

(56) References Cited

U.S. PATENT DOCUMENTS

| | | | |
|---|---|---|---|
| 2022/0060286 A1* | 2/2022 | Yoshioka | H04L 1/1864 |
| 2022/0070829 A1* | 3/2022 | Kusashima | H04L 1/1861 |
| 2022/0070879 A1* | 3/2022 | Ryu | H04W 72/0473 |

OTHER PUBLICATIONS

Apple Inc: "Email Discussion Summary for [RAN-R18-WS-non-eMBB-Apple]", 3GPP Draft, RWS-210552, 3GPP TSG RAN Rel-18 Workshop, RWS-210552, 3rd Generation Partnership Project (3GPP), vol. RAN WG3, No. Electronic meeting, Jun. 28, 2021-Jul. 2, 2021, Jun. 25, 2021 (Jun. 25, 2021), XP052029024, pp. 1-41, Retrieved from the Internet: URL: https://ftp.3gpp.org/tsg_ran/TSG_RAN/TSGR_AHs/2021_06_RAN_Rel18_WS/Docs/RWS-210552.zipRWS-210552 Email discussion summary for [RAN-R18-WS-non-eMBB-Apple].pdf [retrieved on Jun. 25, 2021] p. 29.

Asustek: "Maintenance for PSFCH and PSCCH Symbol on NR Sidelink", 3GPP Draft, R1-2008496, 3GPP TSG RAN WG1 #103-e, 3rd Generation Partnership Project (3GPP), vol. RAN WG1, No. e-Meeting, Oct. 26, 2020-Nov. 13, 2020, Oct. 16, 2020 (Oct. 16, 2020), XP051939554, 4 Pages, Retrieved from the Internet: URL:https://ftp.3gpp.org/tsg_ran/WG1_RL1/TSGR1_103-e/Docs/R1-2008496.zip, R1-2008496, Maintenance for PSFCH and PSCCH Symbol on NR sidelink_v1.0.doc [retrieved on Oct. 16, 2020] paragraph [16.3].

Huawei, et al., "Sidelink Evaluation Methodology Update For Power Saving", 3GPP Draft, R1-2007614, 3GPP TSG RAN WG1 Meeting #103-e, 3rd Generation Partnership Project (3GPP), Mobile Competence Centre, 650, Route Des Lucioles, F-06921 Sophia-Antipolis Cedex, France, vol. RAN WG1, No. E-meeting, Oct. 26, 2020-Nov. 13, 2020, Oct. 24, 2020 (Oct. 24, 2020), XP051946439, 7 Pages, Retrieved from the Internet: URL:https://ftp.3gpp.org/tsg_ran/WG1_RL1/TSGR1_103-e/Docs/R1-2007614.zip R1-2007614.docx [retrieved on Oct. 24, 2020] p. 4.

International Search Report and Written Opinion—PCT/US2021/054435—ISA/EPO—dated Jan. 20, 2022.

Moderator (Samsung): "FL Summary for Thread 1 on Maintenance for 5G V2X with NR Sidelink", 3GPP Draft, R1-2009847, 3GPP TSG RAN WG1 #102-e Meeting, 3rd Generation Partnership Project (3GPP), vol. RAN WG1, No. e Meeting, Aug. 17, 2020-Aug. 28, 2020, Nov. 19, 2020 (Nov. 19, 2020), XP051955991, 35 Pages, Retrieved from the Internet: URL:https://ftp.3gpp.org/tsg_ran/WG1_RL1/TSGR1_103-e/Docs/RI-2009847.zip R1-2009847 FL summary for thread 1 on Maintenance for 5G V2X with NR sidelink_v13.Docx [retrieved on Nov. 19, 2020] paragraph [05 7].

Oppo: "Draft TP on Physical Structure for NK Sidelink", 3GPP Draft, R1-2008230, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020 (Oct. 16, 2020), XP051940052, 4 Pages, Retrieved from the Internet: URL:https://ftp.3gpp.org/tsg_ran/WG1_RL1/TSGR1_10 3-e/Docs/R1-2008230.zip R1-2008230_OPPO_TP for PHY structure.docx [retrieved on Oct. 16, 2020] paragraph [16.3].

* cited by examiner

LONG PHYSICAL SIDELINK SHARED CHANNEL FORMAT FOR SIDELINK COMMUNICATION

BACKGROUND

Technical Field

The present disclosure relates generally to communication systems, and more particularly, to wireless communication involving long physical sidelink shared channel (PSFCH) format.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE) (e.g., a transmitting UE). The apparatus may transmit, to a second UE, an indication to provide hybrid automatic repeat request (HARQ) feedback for at least one sidelink channel. The apparatus may also transmit, to the second UE, the at least one sidelink channel. The apparatus may also receive, from the second UE, an acknowledgement (ACK) or a negative-ACK (NACK) for the at least one sidelink channel via a physical sidelink feedback channel (PSFCH), the PSFCH including a long PSFCH format and associated with a sidelink resource pool.

In an aspect of the disclosure, a method, a computer-readable medium, and an apparatus are provided for wireless communication at a first UE (e.g., a receiving UE). The apparatus may receive, from a second UE, an indication to provide HARQ feedback for at least one sidelink channel. The apparatus may also receive, from the second UE, the at least one sidelink channel. The apparatus may also transmit, to the second UE, an ACK or a NACK for the at least one sidelink channel via a PSFCH, the PSFCH including a long PSFCH format and associated with a sidelink resource pool.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
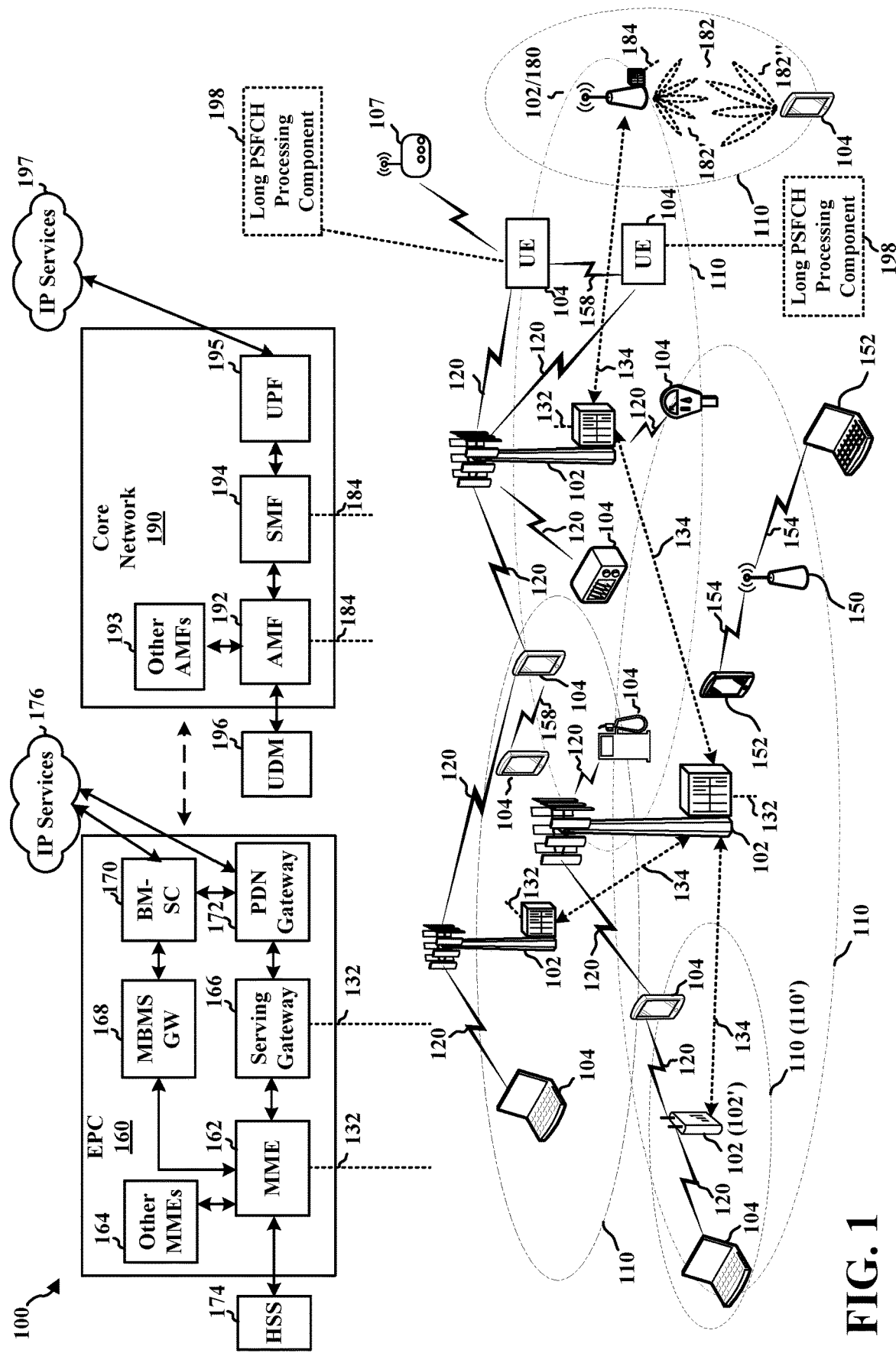
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Figure 2:
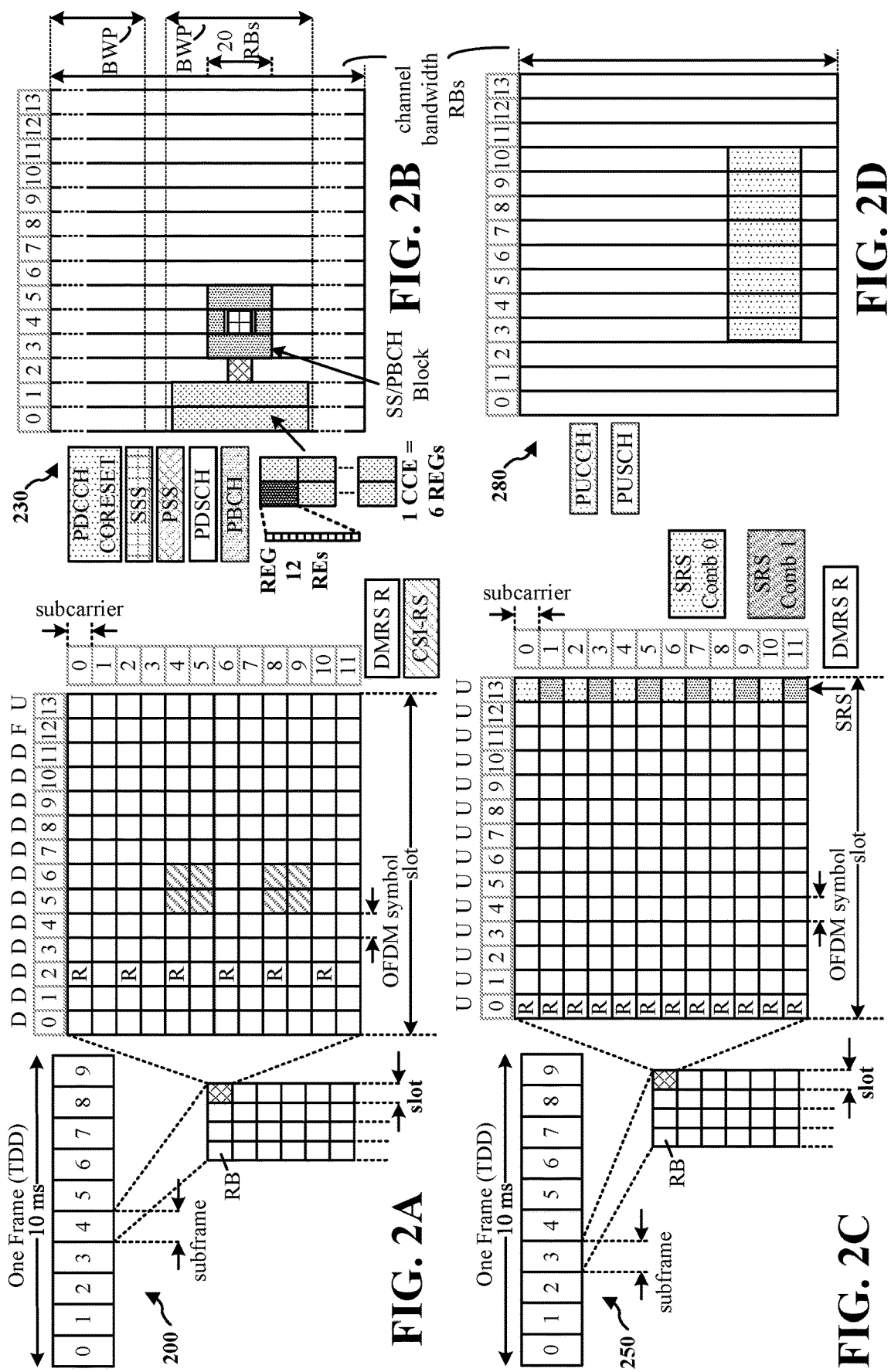
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to include a long PSFCH processing component 198. In one aspect, the long PSFCH processing component 198 may be configured to transmit, to a second UE, an indication to provide HARQ feedback for at least one sidelink channel. The long PSFCH processing component 198 may be configured to transmit, to the second UE, the at least one sidelink channel. The long PSFCH processing component 198 may be configured to receive, from the second UE, an ACK or a NACK for the at least one sidelink channel via a PSFCH, the PSFCH including a long PSFCH format and associated with a sidelink resource pool. In another aspect, the long PSFCH processing component 198 may be configured to receive, from a second UE, an indication to provide HARQ feedback for at least one sidelink channel. The long PSFCH processing component 198 may be configured to receive, from the second UE, the at least one sidelink channel. The long PSFCH processing component 198 may be configured to transmit, to the second UE, an ACK or a NACK for the at least one sidelink channel via a PSFCH, the PSFCH including a long PSFCH format and associated with a sidelink resource pool.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios)

or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to V*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
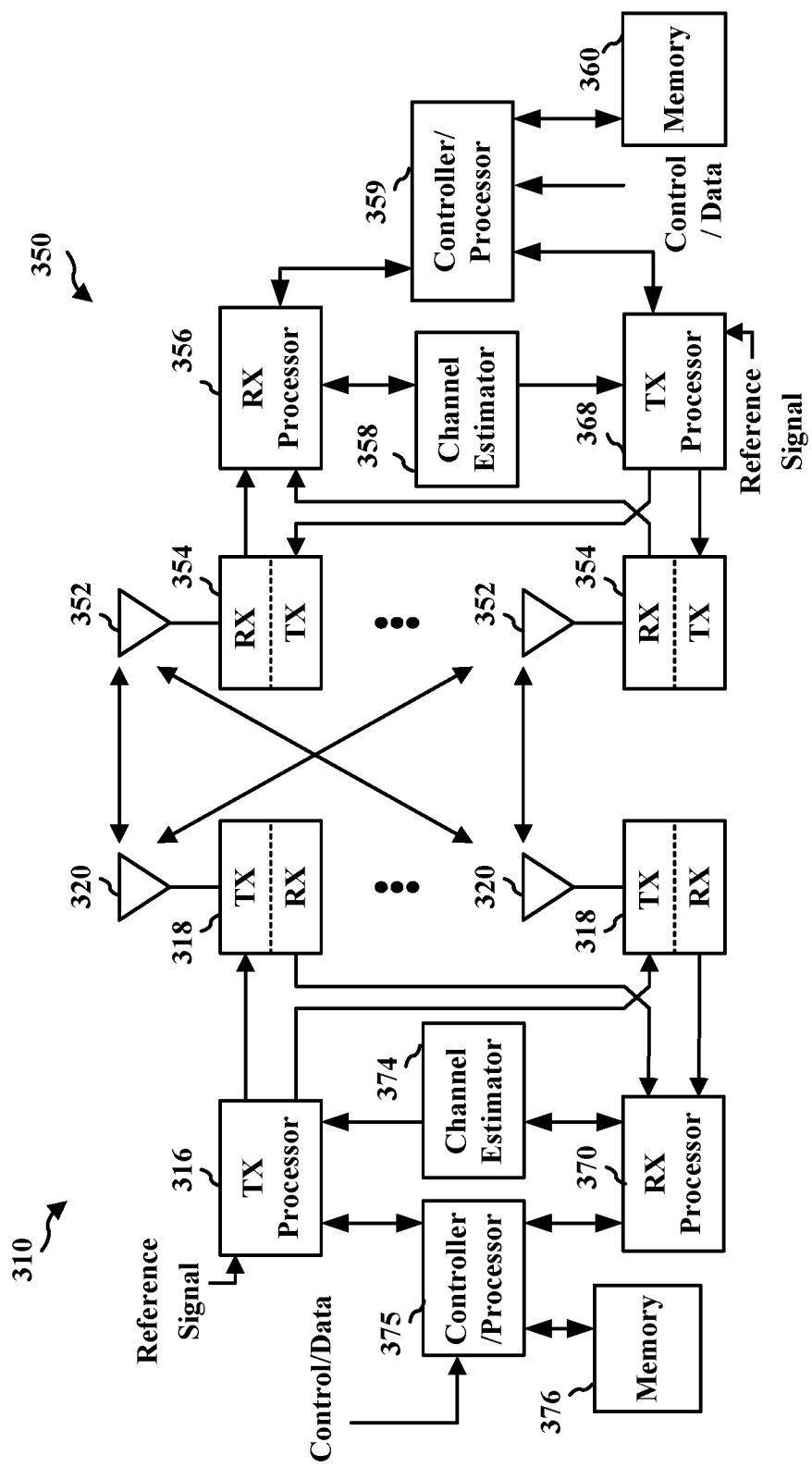
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, the controller/processor 359, the TX processor 316, the RX processor 370, or the controller/processor 375 may be configured to perform aspects in connection with the long PSFCH processing component 198 of FIG. 1. For example, the long PSFCH processing component 198 may be configured to transmit and/or receive HARQ-ACK or HARQ-NACK in a long format PSFCH.

Figure 4A:
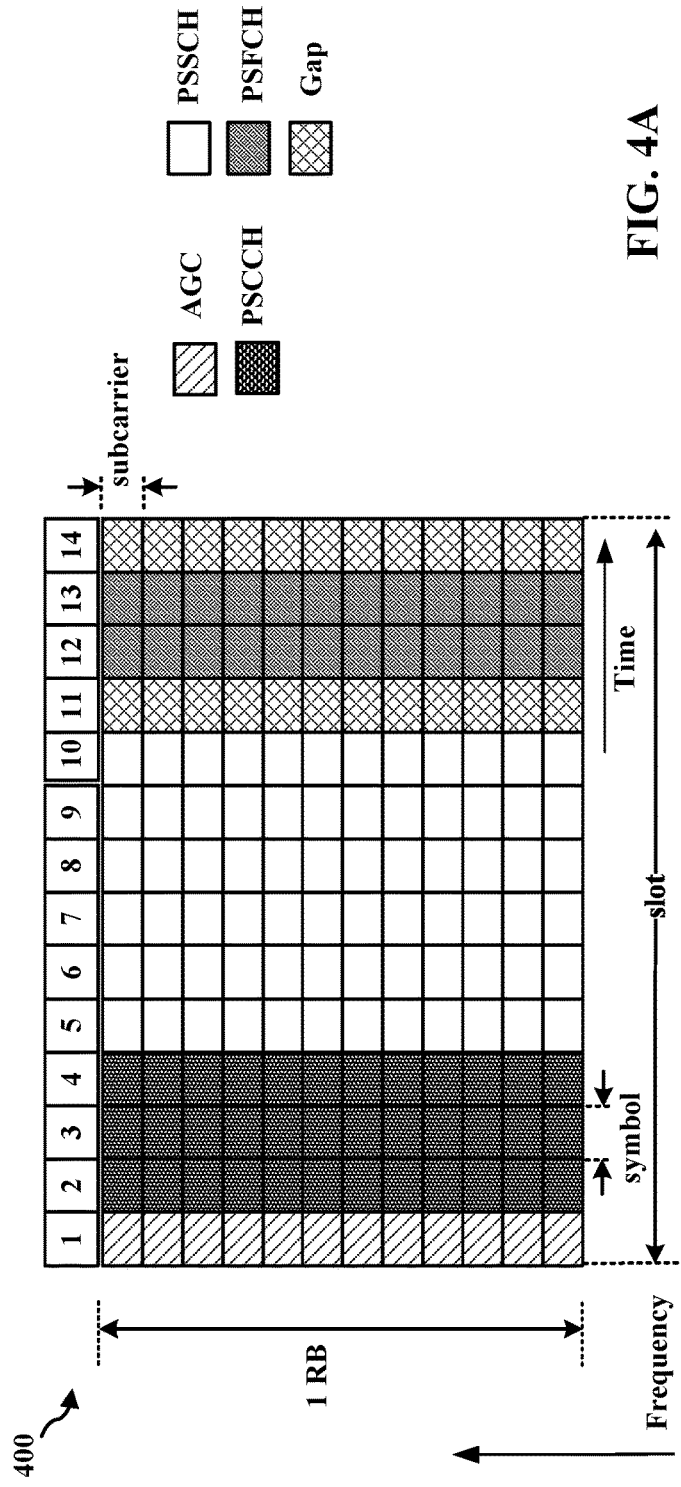
FIGS. 4A and 4B are diagrams illustrating example aspects of slot structures that may be used for sidelink communication.
Figure 4B:
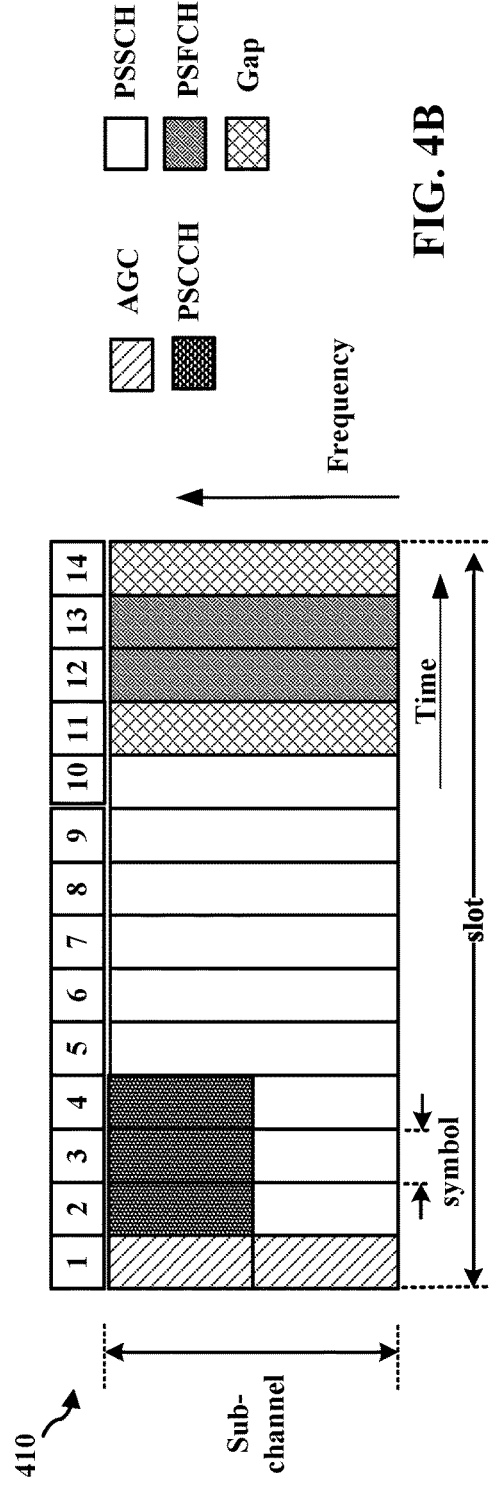

FIGS. 4A and 4B include diagrams 400 and 410 respectively illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structures in FIGS. 4A and 4B are merely examples, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 of FIG. 4A illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. In some examples, the first symbol of the subframe may be a symbol for automatic gain control (AGC) usage (e.g., an AGC symbol), and the last symbol may be a symbol for transmit/receive switching time usage. The AGC symbol may be used to adjust an operating point by a receiving end. The diagram 410 in FIG. 4B illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIGS. 4A and 4B, some of the REs may comprise control information in PSCCH and some REs may comprise demodulation RS (DMRS). At least one symbol may be used for feedback. FIGS. 4A and 4B illustrate examples with two symbols for a physical sidelink feedback channel (PSFCH) with adjacent gap symbols. A symbol prior to and/or after the feedback may be used for turnaround between reception of data and transmission of the feedback. The gap may enable a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIGS. 4A and/or 4B. Multiple slots may be aggregated together in some examples.

Figures 5A, 5B:
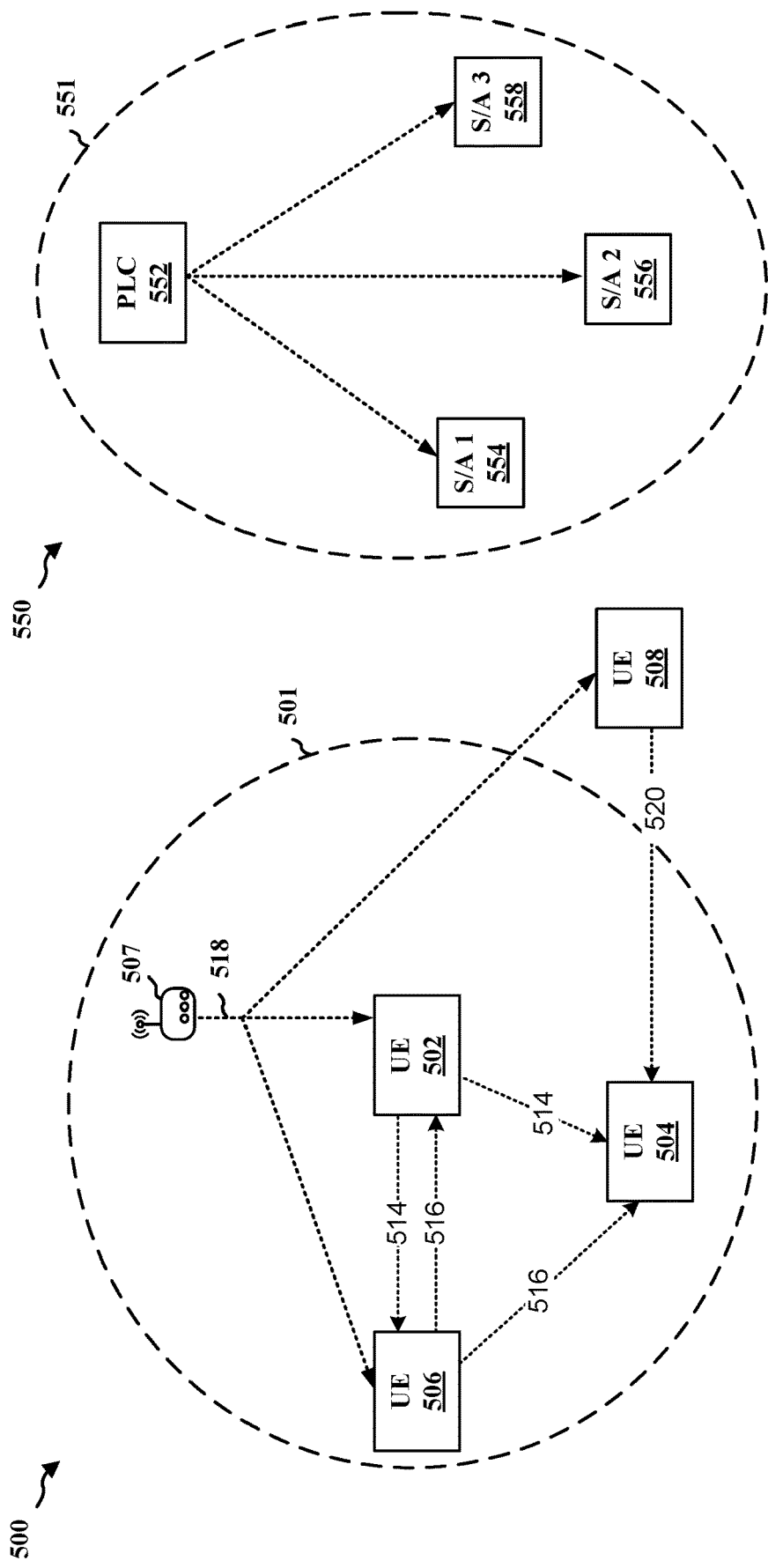
FIG. 5A illustrates an example of wireless communication between devices based on sidelink communication.
FIG. 5B illustrates an example of wireless communication between a PLC and multiple SAs based on sidelink communication

FIG. 5A illustrates an example 500 of wireless communication between devices based on sidelink communication. The communication may be based on a slot structure comprising aspects described in connection with FIG. 4. For example, transmitting UE 502 may transmit a transmission 514, e.g., comprising a control channel and/or a corresponding data channel, that may be received by receiving UEs 504, 506, 508. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 502, 504, 506, 508 may each have the capability to operate as a transmitting device in addition to operating as a receiving device. Thus, UEs 506, 508 are illustrated as transmitting transmissions 516, 520. The transmissions 514, 516, 520 may be broadcast or multicast to nearby devices. For example, UE 502 may transmit communication (e.g., data) for receipt by other UEs (e.g., 504, 506) within a range 501 of UE 502. Additionally, or alternatively, the RSU 507 may receive communication from and/or transmit communication 518 to UEs 502, 506, 508.

Sidelink communication that is exchanged directly between devices may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1"), centralized resource allocation may be provided. For example, a base station 102 or 180 may determine resources for sidelink communication and may allocate resources to different UEs 104 to use for sidelink transmissions. In this first mode, a sidelink UE receives the allocation of sidelink resources from the base station 102 or 180. In another example, the base station may assign transmission (Tx) resources for sidelink communications through DCI format 3_0. The Mode 1 resource allocation may support a dynamic grant (DG), a configured grant (CG) type 1, and/or a CG type 2, where the CG type 1 may be activated via RRC signaling from a base station. The DCI format 3_0 may be transmitted by the base station to allocate time and frequency resources and to indicate transmission timing. The transmitting UE may determine the MCS within a limit set by the base station.

In a second resource allocation mode (which may be referred to herein as "Mode 2"), distributed resource allocation may be provided. In Mode 2, each UE (e.g., a transmitting UE) may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. For example, a transmitting UE may perform channel sensing by blindly decoding all PSCCH channels to find out reserved resources by other sidelink transmissions. The transmitting UE may report available resources to upper layer, and the upper layer may decide resource usage. These resource allocation mechanisms for sidelink may provide power savings, e.g., at a physical layer or a medium access control (MAC) layer. Power savings may be helpful in sidelink applications, such as public safety applications, commercial applications, wearables, etc., which may include both periodic and aperiodic traffic.

Figure 6:
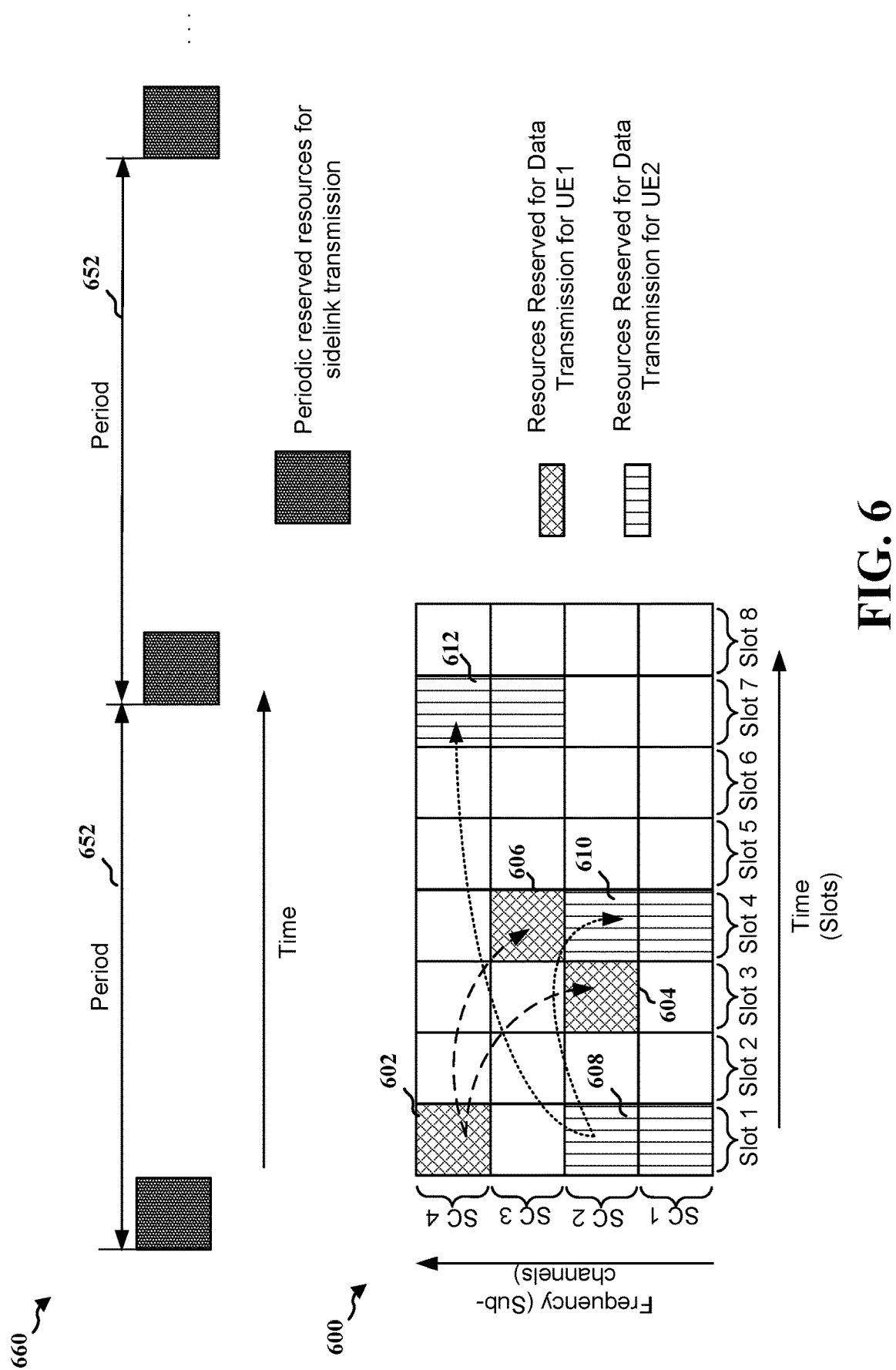
FIG. 6 illustrates an example of period resources that may be reserved by a UE for sidelink communication.

As described above, when operating using Mode 2 (e.g., in a distributed manner), the transmitting UE may determine the resources to use for communicating from a resource pool. A resource pool may refer to a collection of time and/or frequency resources on which sidelink communication may occur. FIG. 6 illustrates an example of time and frequency resources that may be available for sidelink communication. A resource pool may be either preconfigured (e.g., preloaded on a UE), configured by a base station, or otherwise determined by the UE. In some examples, a transmitting UE may randomly select resources from a resource pool for a transmission. In such examples, receiving UEs may continuously monitor candidate resources to receive a communication. Additionally, in some examples, if a nearby UE randomly selects the same resource, a collision or interference may occur.

To receive sidelink packet, such as in C-V2X sidelink communication, a sidelink receiving/reception (Rx) device/

UE may perform blind decoding in all sidelink sub-channels. The number of subchannel may be small, such as between 1 to 27 subchannels, such that the blind decoding of all subchannels may be feasible for the UE. As shown by diagrams 400 and 410 in FIGS. 4A and 4B, both PSCCH and PSSCH may be transmitted within a same slot. The PSSCH may occupy up to $N_{subchannel}^{SL}$ contiguous subchannels, and the PSCCH may occupy up to one subchannel with the lowest subchannel index. As described later in connection with FIG. 8 in details, a $1^{st}$ stage SCI may be transmitted in PSCCH containing information about PSSCH bandwidth and resource reservations in future slots, and a $2^{nd}$ stage SCI may be found and decoded after decoding PSCCH. The source ID and/or the destination ID in the SCI may be used by a UE (e.g., a receiving UE) to distinguish whether the packet is for the UE and/or coming from which UE. Sub-channel size in V2X may have a minimum of 10 RBs. Under C-V2X sidelink communication, UEs may be expected to decode all transmissions. Thus, the UE may perform blind decoding of all subchannels.

Communications over sidelink channels (e.g., D2D communications) may provide various advantages and improvements for wireless communications, such as providing an ultra-low latency for communication among wireless devices. For example, in Industrial IoT (IIoT), sidelink may enable direct programmable logical controller (PLC) and sensors/actuators (SAs) communications. FIG. 5B illustrates an example 550 of wireless communication between a PLC and multiple SAs based on sidelink communication. Wireless PLC (e.g., 552) may be desired for flexible and simple deployment in IIoT. For example, a PLC 552 may be configured to control multiple (e.g., 20-50) SAs (e.g., SA 554, SA 556 and SA 558) wirelessly through sidelinks (e.g., within its transmission range 551). In some instances, IIoT devices/system may have a tight latency specification of 1 to 2 ms and an ultra-reliability specification of $10^{-6}$ error rate. However, communication through the base station may specify multiple over-the-air (OTA) transmissions, which may affect the latency and/or the reliability of the communication. Thus, sidelink communication may be more suitable for IIoT devices. In some examples, IIoT traffic may typically be deterministic and have small packet size of 32-256 bytes. Thus, the bandwidth for the traffic may be low, e.g., 2 RBs may be sufficient for some cases. In addition, SAs may have constraint on UE capability in terms of bandwidth and processing power. On the other hand, the overall bandwidth may be large for IIoT with dedicated frequency bands and/or unlicensed bands. In some applications, SAs (e.g., SA 554, SA 556 and SA 558) may be configured not to detect/monitor all transmissions (e.g., to preserve power). For IIoT, the PSCCH used by a transmitting device (e.g., the PLC 552) may have a stringent IIoT specification, which may be challenging at times when RF environments include blockage and interference.

In some examples, a UE may use historical resource utilization of other UEs to predict future activity. For example, by identifying that a first UE transmits periodically and what resources the first UE uses when transmitting, a second UE may determine on which resources future transmissions by the first UE may occur and also when they may occur. FIG. 6 illustrates an example of period resources 660 that may be reserved by a UE for sidelink communication. Thus, by "listening" to other UE activity in the past (e.g., historical resource utilization), the second UE may predict future activity of the other UEs and can select a resource to use for a transmission that is less likely to result in a collision and/or interference. However, it may be appreciated that for the second UE to identify historical resource utilization, the second UE may operate in an "always-on" mode to facilitate sensing or receiving of transmission by the other UEs. The continual monitoring by the second UE may increase power consumption or processing resources in order to identify historical resource utilization and to predict future activity.

In some examples, a UE may perform partial sensing for determining historical resource utilization of other UEs. When performing partial sensing, the UE may selectively sense a subset of resources and, thus, may reduce power consumption in comparison to monitoring the set of resources. However, partial sensing may not be effective when transmissions by other UEs are not periodic. For example, a UE employing partial sensing may miss information about aperiodic transmissions and, thus, may be unable to accurately predict future activity of the other UEs based on a determined historical resource utilization.

The radio resource allocation for a sidelink communication may be based on resource reservations. For instance, when a UE is preparing to transmit data on a sidelink, the UE may first determine whether resources are reserved by other UEs. Then, the UE may reserve resources from the remaining unreserved resources that are available. Referring back to FIG. 6, the resource allocation for each UE may be in units of one or more sub-channels in the frequency domain (e.g., sub-channels SC 1 to SC 4), and may be based on one slot in the time domain. The UE may also use resources in the current slot to perform an initial transmission, and may reserve resources in future slots for retransmissions. In this example, up to two different future slots may be reserved by the UEs (e.g., UE1 and UE2) for retransmissions. The resource reservation may be limited to a window of pre-defined slots and sub-channels, such as an 8 time slots by 4 sub-channels window as shown in diagram 600 of FIG. 6, which provides 32 available resource blocks in total. This window may also be referred to as a resource selection window. Each resource block in the resource selection window may be used to transmit both data and control information together.

In one aspect, a first UE ("UE1") may reserve a sub-channel (e.g., SC 4) in a current slot (e.g., slot 1) for its initial data transmission (e.g., using resources 602), and may reserve additional future slots within the window for data retransmissions (e.g., 604 and 606). For example, UE1 may reserve sub-channels SC 2 at slots 3 and SC 3 at slot 4 for future retransmissions as shown by FIG. 6. UE1 may then transmit information regarding which resources are being used and/or reserved by it to other UE(s), such as by including the reservation information in the reservation resource field of the SCI, e.g., a first stage SCI. A UE may be configured to use the SCI to reserve one, two, or three transmissions. A maximum number of reservation allowed for a UE may be pre-configured for the UE. For example, a UE may be reserve up to three transmissions within a resource selection window.

As illustrated by FIG. 6, a second UE ("UE2") may also reserve resources in sub-channels SC 1 and SC 2 at time slot 1 for its current data transmission (e.g., using resources 608), and may reserve first data retransmission (using resources 610) at time slot 4 using sub-channels SC 1 and SC 2, and reserve second data retransmission (using resources 612) at time slot 7 using sub-channels SC 3 and SC 4 as shown by FIG. 6. Similarly, UE2 may then transmit the resource usage and reservation information to other UE(s), such as using the reservation resource field in SCI. The UE may also be configured to make all the reservations with same number of sub-channels (e.g., bandwidth). For example, resources 602, 604, and 606 reserved by UE1 may have same number of sub-channels (e.g., 1), and resources 608, 610, and 612 reserved by UE2 may have same number of sub-channels (e.g., 2). However, the starting sub-channel for each reserved resource may be different. For example, resource 602 may start at SC 4, resource 604 may start at SC 2, and resource 606 may start at SC3, etc.

Figure 7:
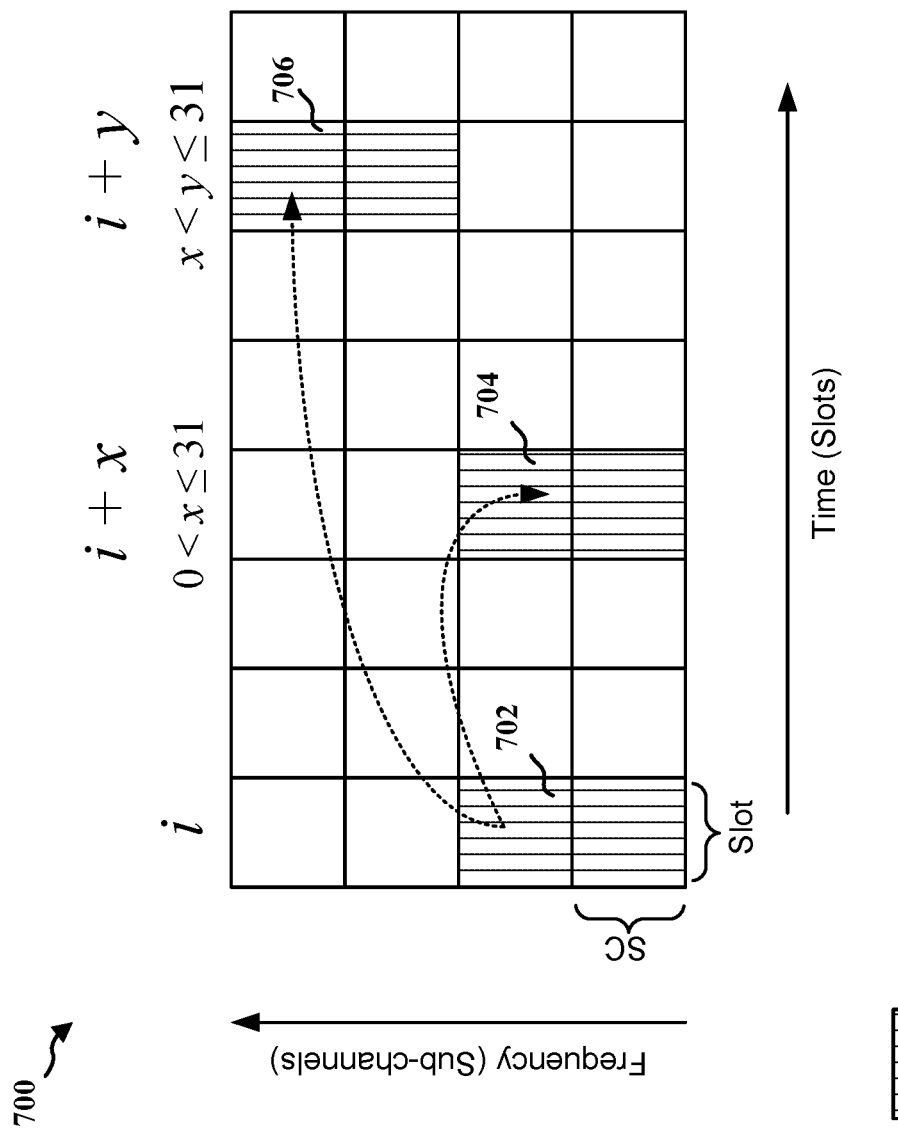
FIG. 7 is a diagram illustrating an example process of a resource reservation.

FIG. 7 is a diagram 700 illustrating an example process of a resource reservation. When a UE (e.g., sidelink transmitting UE) is using the first reserved resource 702 for transmission at slot i in a period (such as period 652 illustrated in FIG. 6), the UE may reserve two more resources within the same period, such as resource 704 at slot i+x and resource 706 at slot i+y. Each reserved resource 702, 704, and 706 may have number z of sub-channels. For example, if the period has 32 slots with slot index 0 to 31, the UE may transmit the first reserved resource 702 at slot 0 with z sub-channels, and may reserve a second resource 704 with z sub-channels at slot i+x, where x is 0<x≤31, and may further reserve a third resource 706 with z sub-channels at slot i+y, where y is x<y≤31. Table 1 below is an example reservations signaled by the SCI of the UE in slot i corresponding to FIG. 6.

TABLE 1

Reservations signaled by An SCI in Slot i

| Reservation | # Sub-channels | Slot |
|---|---|---|
| 1 | Z | i |
| 2 | Z | i + x: 0 < x ≤ 31 |
| 3 | Z | i + y: x < y ≤ 31 |

The UE may use the resource 704 and resource 706 for retransmission of the resource 702, such as when the transmission of the resource 702 fails. The UE may also use the reserved resources 704 and/or 706 for other purposes other than retransmission.

The sidelink resource reservation may be periodic or aperiodic. For example, a UE may periodically reserve resources, such as by indicating a reservation period in an SCI. Thus, when the periodic resource reservation is enabled, the reservations in the SCI may be repeated with the signaled period. In some examples, the UE may indicate the resource reservation in multiple SCI parts. For example, the UE may transmit a first part of the reservation in a physical sidelink control channel (PSCCH) region, and may transmit a second part of the reservation in a physical sidelink shared channel (PSSCH) region. For an example, a first stage control (e.g., SCI-1) may be transmitted on a PSCCH and contain resource allocation and information related to the decoding of a second stage control (e.g., SCI-2), and the second stage control may be transmitted on a PSSCH and contain information for decoding data (SCH). Therefore, multiple resources may be indicated, or reserved, through a combination of the first SCI part indicated in the PSCCH region and the second SCI part in the PSSCH region. For example, the first SCI part in the PSCCH may reserve resources for a UE in a PSSCH, and the first SCI part may also indicate to a receiving UE that there is a second SCI part or more (e.g., two-stage SCI) in the PSSCH. The second SCI part may reserve other resources or provide signaling and/or information to the UE which may be unrelated to the resources reserved in the first SCI part.

Figure 8:
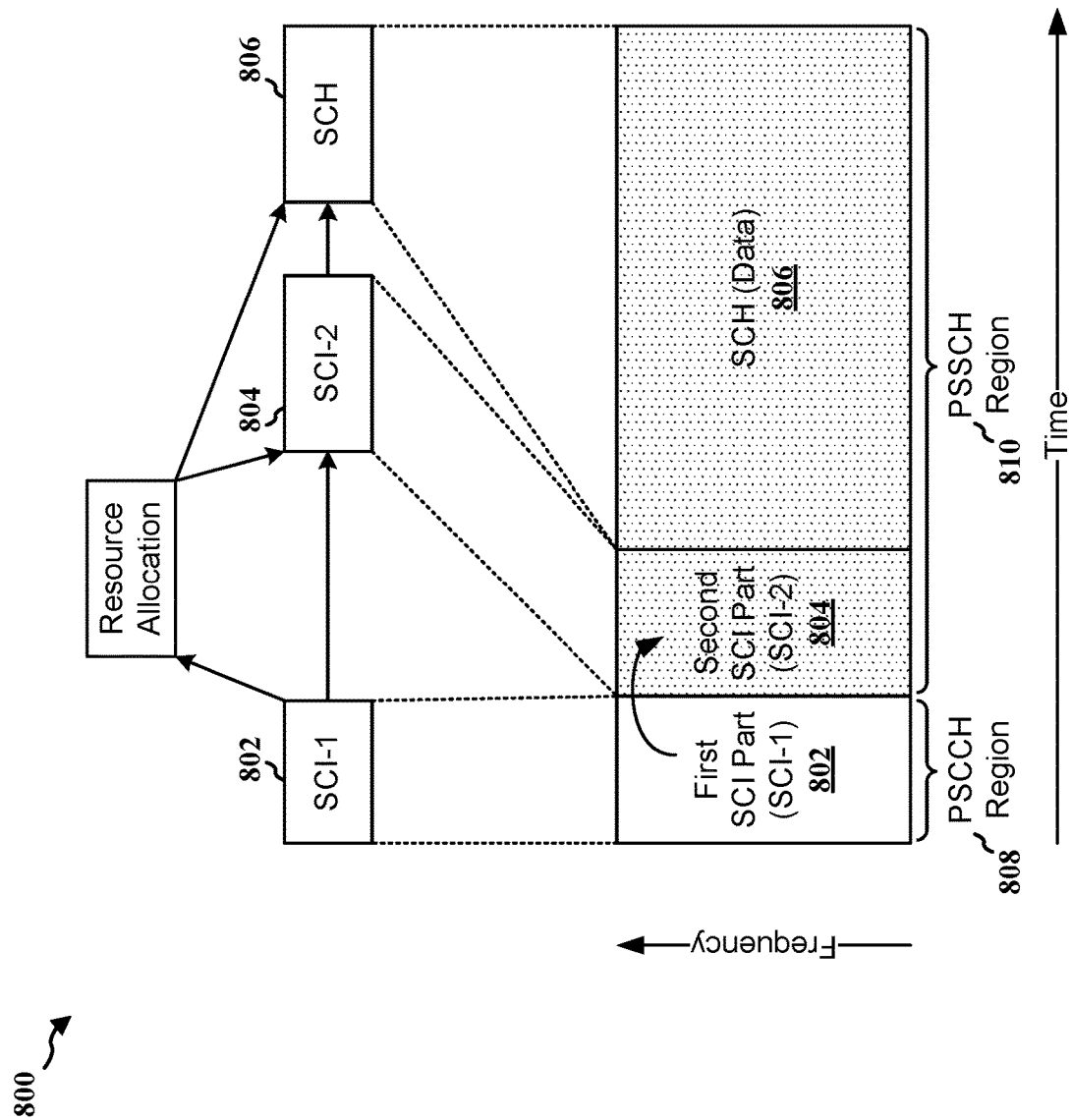
FIG. 8 is a diagram 800 illustrating an example of a two-stage PSCCH.

FIG. 8 is a diagram 800 illustrating an example of a two-stage PSCCH. To reduce control overhead and to improve the processing timeline, SCI used for sidelink grant(s) may split into two parts or more. A first SCI part 802 may be transmitted within the control region (e.g., the PSCCH region 808) and a second SCI part 804 may be transmitted within the downlink traffic region (e.g., the PSSCH region 810). The PSCCH region 808 and the PSSCH region 810 may together form one slot. The first SCI part 802 may include initial control information regarding a sidelink transmission, such as the resource assignment (RA) in SCH 806 or other resource reservation information, rank and modulation order of the sidelink assignment, etc. In addition, the first SCI part 802 may also include control information about the second SCI part 804. In some examples, the control information may indicate the number of resource elements (size) and code rate of the second SCI part 804. The control information may further indicate the location (e.g., starting resource element) and code rate of the second SCI part 804. The second SCI part 804 may include the remaining control information regarding the sidelink assignment. For example, the remaining control information may include non-time control information or other resource allocation for data transmission in SCH 806, such as the source and destination ID for the data transmission.

In one aspect, the first SCI part 802 (e.g., SCI-1) format may comprise one or more of followings: 1) a priority (QoS value) (e.g., 3 bits); 2) a PSSCH/frequency resource assignment (e.g., frequency/time resource for PSSCH), bits may depend on number of slot reservations and/or number of subchannels; 3) a time resource assignment, e.g., 5 or 9 bits for 2 or 3 reservations (see below); 4) a resource reservation period (e.g., if enabled), where bits may depend on number of allowed periods; 5) a DMRS (e.g., PSSCH and/or PSCCH DMRS) pattern (e.g., if more than one patterns are configured), bits may depending on number of configured patterns; 6) a second SCI format (e.g., information on the size of the second SCI), which may be 2 bit; 7) a beta offset for second SCI format rate matching, which may be 2 bits; 8) a 2-bit beta offset for second stage control resource allocation; 9) number of PSSCH DMRS port(s) (e.g., 1 or 2); 10) DM-RS port, where 1 bit may be used to indicate one or two data layers; 11) a 5-bit MCS; 12) additional MCS table that is 0 to 2 bits; 13) a PSFCH overhead indicator which may be 0 or 1 bit and/or 14) one or more reserved bits (e.g., bits up to upper layer), etc. In another aspect, the first SCI part 802 may be configured to be decoded by the receivers and other sidelink UEs (e.g., such as UEs in Mode 2 resource allocation) to allow/enable channel sensing and/or to avoid resource collision. In some examples, for SCI format 1_0 in PSCCH, bits for frequency domain resource allocation (FDRA) may be determined by:

$$\left\lceil \log \frac{N_{subchannel}^{SL}(N_{subchannel}^{SL}+1)}{2} \right\rceil \text{ bits for 2 resource reservations,}$$

$$\text{and} \left\lceil \log \frac{N_{subchannel}^{SL}(N_{subchannel}^{SL}+1)(2N_{subchannel}^{SL}+1)}{6} \right\rceil$$

bits for 3 resource reservations.

For time domain resource allocation (TDRA), 5 bits may be used for 2 resource reservations, and 9 bits may be used for 3 resource reservations.

In another aspect, the second SCI part 804 (e.g., SCI-2) format may comprise one or more of followings: 1) a HARQ ID, where its bits may depend on number of HARQ process; 2) a new data indicator (NDI), which may be 1 bit; 3) a redundancy version (ID)-ID, which may be 2 bits; 4) a source ID (e.g., transmitting UE ID), which may be 8 bits; 5) a destination ID (e.g., receiving UE ID), which may be 16 bits; 6) a HARQ enable/disable indication, which may be 1 bit; 7) SCI 2-A exclusive fields: a) cast type, which may be 2 bits indicating whether the transmission is a broadcast, a groupcast or a unicast, and/or b) a CSI request which may be 1 bit; and/or 8) SCI 2-B exclusive fields (e.g., NACK-exclusive groupcast): a) a Zone ID, which may be 12 bits, and/or b) a communication range, which may be 4 bits, etc. The SCI 2-A may refer to a $2^{nd}$-stage SCI $A^{th}$ type, and the SCI 2-B may refer to a $2^{nd}$-stage SCI $B^{th}$ type. The second SCI part 804 may be used by the receiving device for decoding the associated PSSCH.

When a transmitting device (e.g., a sidelink device, a first UE, a base station, an RSU) transmits a PSSCH to a receiving device (e.g., a second UE, another sidelink device) over the sidelink, the receiving device may respond with HARQ feedback (e.g., ACK/NACK) corresponding to the received PSSCH through a physical sidelink feedback channel (PSFCH) transmission to the transmitting device. The PSFCH may share a same sidelink resource pool as the PSCCH and the PSSCH, where the receiving device may determine a PSFCH resource for transmitting the HARQ feedback from a configured PSFCH resource pool. The PSFCH may be enabled for unicast and/or groupcast communications. For example, in unicast communication, a receiving device may transmit a 1-bit ACK/NACK feedback (e.g., 0=NACK, 1=ACK, etc.) to the transmitting device using the PSFCH to indicate whether the transmitting device has successfully decoded a received PSSCH. For groupcast communication, a receiving device may transmit the HARQ feedback in one of two feedback modes via the PSFCH. In a first feedback mode, the receiving device may transmit negative feedback (e.g., NACK) to the transmitting device when the receiving device fails to decode a received PSSCH, and the receiving device may skip transmitting positive feedback (e.g., ACK) to the transmitting device when the receiving device successfully decodes a received PSSCH. The first mode may be referred to as NACK based feedback or NACK exclusive feedback. In a second mode, the receiving device may transmit a positive feedback to the transmitting device when the receiving device successfully decodes a received PSSCH, and the receiving device may transmit a negative feedback to the transmitting device when the receiving device fails to decode a received PSSCH.

Figure 9:
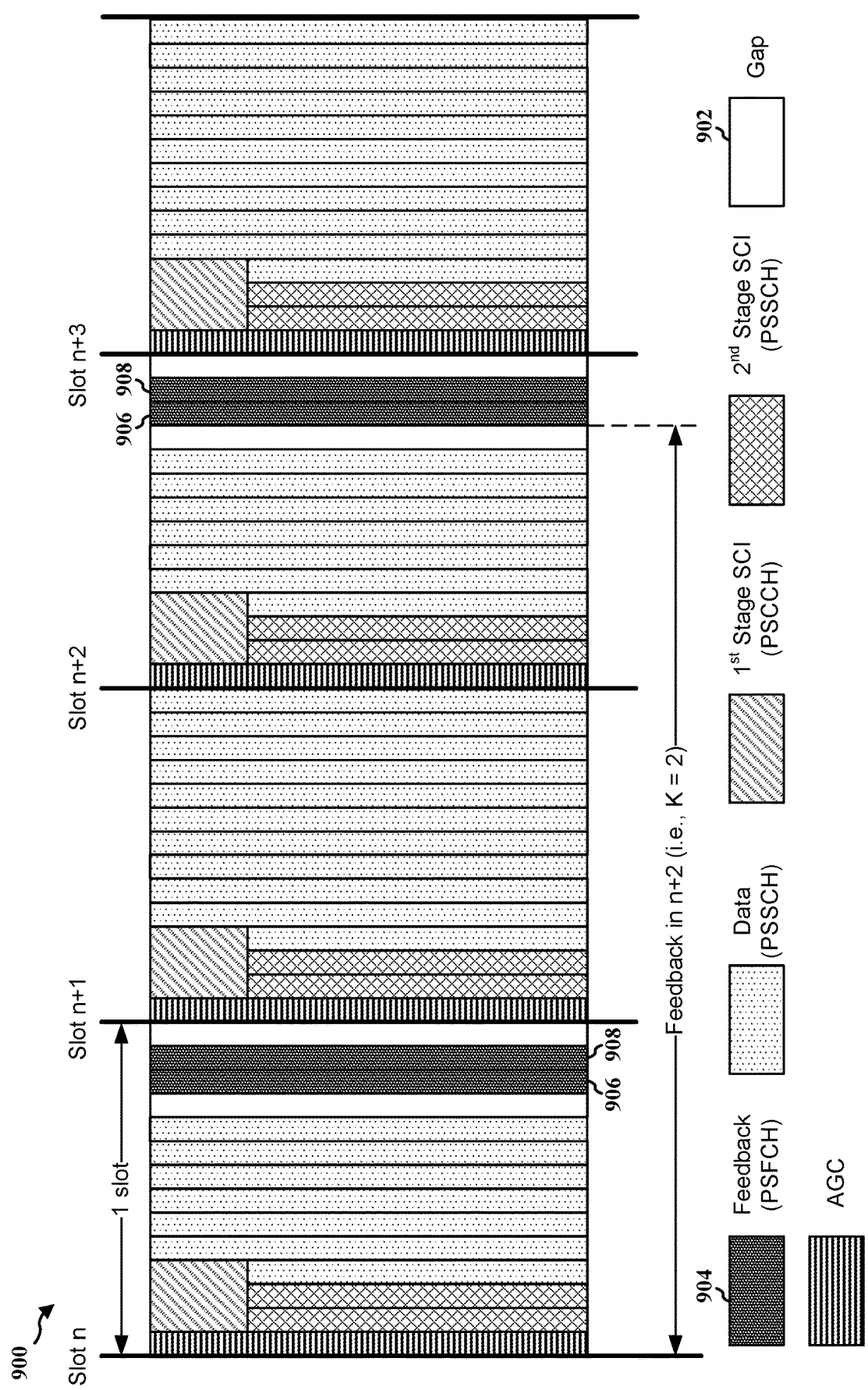
FIG. 9 is a diagram illustrating an example PSFCH configuration.

FIG. 9 is a diagram 900 illustrating an example PSFCH configuration. The PSFCH resources (e.g., a PSFCH resource pool) may be periodic system-wide feedback resources that are configured (e.g., loaded on a sidelink device) or configured by a network (e.g., by a base station). The PSFCH resources may also be configured with a periodicity N which may indicate how often the PSFCH resources are being configured in a sidelink resource pool. For example, the periodicity N may be 1, 2, or 4 slots. If N=1 slot, it may indicate that the PSFCH resources are configured (e.g., available) in every slot within the sidelink resource pool, and if N=2, such as illustrated by diagram 900, it may indicate that the PSFCH resources are configured in every two slots within the sidelink resource pool, etc. In some configurations, if N=0, if may indicate that the PSFCH is disabled. A transmitting device may indicate the periodicity of the PSFCH to a receiving device in SCI (e.g., a 1-bit indication in SCI-1). In one example, as shown by diagram 900, when the PSFCH resources are configured for a slot, the PSFCH resources may occupy three OFDM symbols within the slot, where one symbol may be used for a gap 902 and two symbols may be used for the PSFCH 904. For example, the gap 902 may use a symbol prior to and/or after the PSFCH 904, and the gap 902 may be used by the sidelink device for turnaround between reception of data and transmission of the HARQ feedback.

The number of physical resource blocks (PRBs) used for the PSFCH may be configured, such as by a bitmap. For example, in one of PUCCH formats (e.g., Format 0), there may be one resource block (RB) carrying HARQ-ACK information for a single PSSCH transmission, where the PSFCH format 0 sequence may be repeated on 2 PSFCH symbols. For example, referring back to FIG. 9, for the PSFCH 904 with two OFDM symbols, one symbol (e.g., a symbol 908) may be used for providing the HARQ feedback (e.g., ACK or NACK), and another symbol (e.g., a symbol 906) may be a duplication of the HARQ feedback (e.g., duplication of the symbol 908). There may also be a timing gap K configured for the PSFCH resources, where the timing gap may indicate a duration between a slot carrying a PSSCH and a corresponding slot that is configured with the PSFCH resources for providing the HARQ feedback for the PSSCH. Thus, when a receiving device receives a PSSCH in slot n, the receiving device may transmit a corresponding HARQ feedback through a PSFCH resources in slot (n+K). For example, as shown by diagram 900, if the timing gap K=2, then a sidelink device receiving a PSSCH at slot n may transmit the corresponding HARQ feedback using the PSSCH resources within the slot n+2. In some examples, there may be a minimum time gap of 2 or 3 slots between PSFCH (e.g., HARQ feedback) and associated PSSCH reception.

The PSFCH may use PUCCH format 0 waveform for transmission, which may be a sequence-based waveform without a modulation and/or a coding layer. For example, the waveform for the PSFCH may be associated with one or more multiplexing cyclic shifts (CSs). In another example, the number of CS pairs used/supported for a PSFCH transmission that may be multiplexed in a PRB may be (pre-)configured (e.g., by upper layer) per resource pool among {1, 2, 3, 4, 6} slots. PSFCH resources may be (pre-)configured by rbSetPSFCH (bitmap), which is described in details below.

Figure 10:
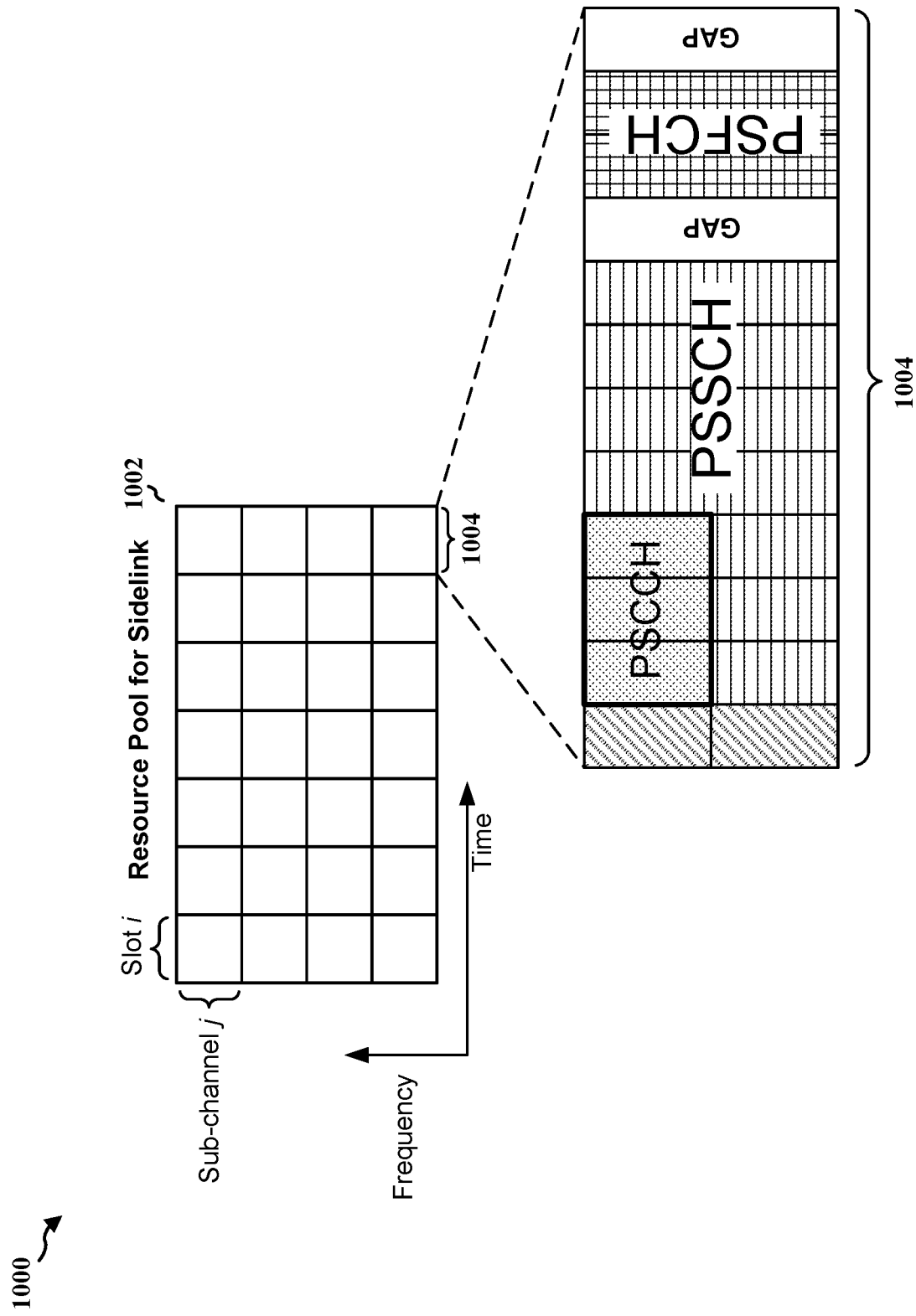
FIG. 10 is a diagram illustrating an example sidelink resource pool and structure of a sidelink slot including PSFCH.

FIG. 10 is a diagram 1000 illustrating an example sidelink resource pool 1002 and structure of a sidelink slot 1004 including PSFCH within the sidelink resource pool 1002. The sidelink resource pool 1002 may be a collection of time and/or frequency resources on which sidelink communication may occur. The sidelink resource pool 1002 may be loaded on a UE or configured by base station. In one aspect, the PSFCH may be mapped to one RB. A UE may be provided with a set of PRBs (e.g., by a PSFCH resource block set parameter rbSetPSFCH) for PSFCH in a resource pool. The UE may identify the PSFCH RB candidates for subchannel j and PSSCH slots i, where $0 \leq i < N_{PSFCH}$, which may be determined by the period of PSFCH. The number of candidate RBs may be determined by $$M_{subc,slot} = \#rbSetPSFCH/(periodPSFCH*numSubChannel),$$

and the candidates RBs may be determined by $$(i+jN_{PSFCH}) \cdot M_{subc,slot} \text{ to } (i+1+jN_{PSFCH}) \cdot M_{subc,slot} - 1.$$

For example, if $N_{PSFCH}=2$ and $M_{subc,slot}=5$, for j=0 and i=0, the candidate RBs may be [0, 4]; and for j=0 and i=1, the candidate RBs may be [5, 9]. In another aspect, a UE may be provided with a set of $M_{PRB,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE may allocate the [(i+j·$N_{PSSCH}^{PSFCH}$)·$M_{subch,slot}^{PSFCH}$ ~ (i+1+j·$N_{PSSCH}^{PSFCH}$)·$M_{subch,slot}^{PSFCH}$ −1] PRBs from the $M_{PRB,set}^{PSFCH}$ PRBs to slot (i+1) among the PSSCH slots associated with the PSFCH slot and sub-channel j, where $M_{subch,slot}^{PSFCH}$=$M_{PRB,set}^{PSFCH}$/(($N_{subch}$·$N_{PSSCH}^{PSFCH}$), 0≤i<$N_{PSSCH}^{PSFCH}$, 0≤j<$N_{subch}$, and the allocation may start in an ascending order of i and continues in an ascending order of j. The UE may expect that $M_{PRB,set}^{PSFCH}$ is a multiple of $N_{subch}$·$N_{PSSCH}^{PSFCH}$. In another aspect, the UE may further determine resources for multiplexing PSFCH as R=$N_{type}$·$M_{subc,slot}$·#CS. For example, $N_{type}^{PSFCH}$ by higher layer, if equal to 1, PRBs may be associated with the starting subchannel of the corresponding PSSCH. If $N_{type}^{PSFCH}$=#subchPSSCH, PRBs may be associated with one or more subchannels of the corresponding PSSCH. The UE may select one RB out of the available resources according to ($P_{ID}$+$M_{ID}$) mod R, where $P_{ID}$ may be the transmitter ID and $M_{ID}$ may be the receiver ID for groupcast of SCI 2-A and $M_{ID}$=0 otherwise. The PSFCH may be duplicated in the preceding OFDM symbol.

In some examples, the PSFCH may be based on Zadoff-Chu (ZC) sequence, where the ZC sequence may be generated according to group and sequence number. For example, ZC group number u=($f_{gh}$+$f_{ss}$) mod 30 may depend on PSFCH hopping configuration (e.g., sl-PSFCH-HopID-r16). Cyclic shift hopping may be determined according to:

$$\alpha_l = \frac{2\pi}{12}\left(\left(m_0 + m_{CS} + n_{cs}\left(n_{s,f}^\mu, l + l'\right)\right) \bmod 12\right),$$

where $m_0$ may depend on PSFCH config on supported CS pairs, $m_{CS}$ may depend on the value of ACK/NACK and the HARQ mode (NACK-exclusive or ACK/NACK), and $n_{cs}$ ($n_{s,f}^\mu$,l+l') may be a function depending on slot number, symbol index of PSFCH.

In some examples, referring back to the sidelink slot 1004 including PSFCH in FIG. 10, PSCCH may be (pre)configured to occupy {10, 12, 15, 20, 25} PRBs, and the PSCCH may also be limited to a single sub-channel. The PSCCH duration may be (pre)configured to 2 or 3 symbols. A sub-channel may occupy {10, 15, 20, 25, 50, 75, 100} PRBs, and a resource pool (RP) may include 1 to 27 subchannels. The PSCCH size may be fixed for the resource pool, such as 10% to 100% of one subchannel (e.g., first 2 or 3 symbols) depending on the configuration. In one example, the PSSCH may occupy at least one (1) subchannel and contain the $2^{nd}$ stage SCI, such as described in connection with FIG. 8.

As discussed in connection with FIGS. 5A and 5B, a transmitting device (e.g., the PLC 552) may be communicating with multiple receiving devices (e.g., SAs 554, 556, 558) over sidelink channels. As the communication (e.g., PSSCH and/or PSCCH transmission/reception) between the transmitting device and the receiving device may have a tight latency specification of 1 to 2 ms and an ultra-reliability specification of $10^{-6}$ error rate, the PSFCH (e.g., the HARQ feedback) from the receiving device may have the same or more stringent specification, such that the transmitting device may reliably determine whether to retransmit data based on the received PSFCH (e.g., if a NACK is received or if an ACK is not received for the data). Thus, sidelink communications may be improved when the reliability of the PSFCH is enhanced. Table 1 below shows an example SNR specification for NACK-to-ACK failure rate of 0.001 with PUCCH format 1 (e.g., 1-RB with up to 14 symbols, 7 orthogonal cover code (OCC)). In other words, the NACK to ACK probability may not exceed 0.1% at the SNR given in Table 1.

TABLE 1

Minimum specifications for PUCCH format 1 with 15 kHz SCS

| Number of TX antennas | Number of RX antennas | Cyclic Prefix | Propagation conditions and correlation matrix (Annex TBD) | Channel bandwidth/SNR (dB) | | |
|---|---|---|---|---|---|---|
| | | | | 5 MHz | 10 MHz | 20 MHz |
| 1 | 2 | Normal | TDLC-300-100 Low | −3.8 | −3.6 | −3.6 |
| | 4 | Normal | TDLC-300-100 Low | −8.4 | −7.6 | −8.4 |
| | 8 | Normal | TDLC-300-100 Low | −11.8 | −11.4 | −11.4 |

A UE may reliably decode PSCCH and/or PSSCH (e.g., the failure rate is below a threshold) when the PSCCH and/or the PSSCH is received with an SNR above a threshold. For example, an SCI-2 decoding may specify a minimum SNR of −2 dB or 1.5 dB to achieve an error rate of 0.01. However, the same SNR (e.g., −2 dB or 1.5 dB) threshold may not be reliable enough for the UE to decode PSFCH, as the SNR threshold and/or the failure rate specification for the PSFCH may relatively be higher. For example, the sidelink PSFCH design may use a significantly larger SNR by log(7) (e.g., 7 times spreading in PUCCH format 1), which may be approximately 5 dB to achieve the 0.001 failure rate. For some IIoT devices, less than 0.0001 failure rate may be targeted. Thus, PSFCH configurations that use one or two symbols may not be sufficient for some IIoT devices to meet the targeted failure rate (e.g., an end-to-end (E2E) reliability of $10^{-6}$), and utilization of PSFCH may be low (e.g., below 1%).

Aspects presented herein may improve and/or boost the reliability of PFSCH to enable the PFSCH transmission to achieve lower error rate. Aspects presented herein may also enable additional message to be multiplexed/transmitted with the HARQ feedback. In one aspect of the present disclosure, a sidelink device may be configured to use a PSFCH with long PSFCH format or a PSFCH with short PSFCH format within a sidelink resource pool for providing sidelink HARQ feedback (e.g., ACK or NACK) depending on the circumstances and/or configurations. In another aspect, the sidelink device may multiplex messages such as CSI report, scheduling request, and/or buffer status report with the HARQ feedback in the PSFCH with long PFFCH format as the payload size for the PSFCH is increased.

Figure 11A:
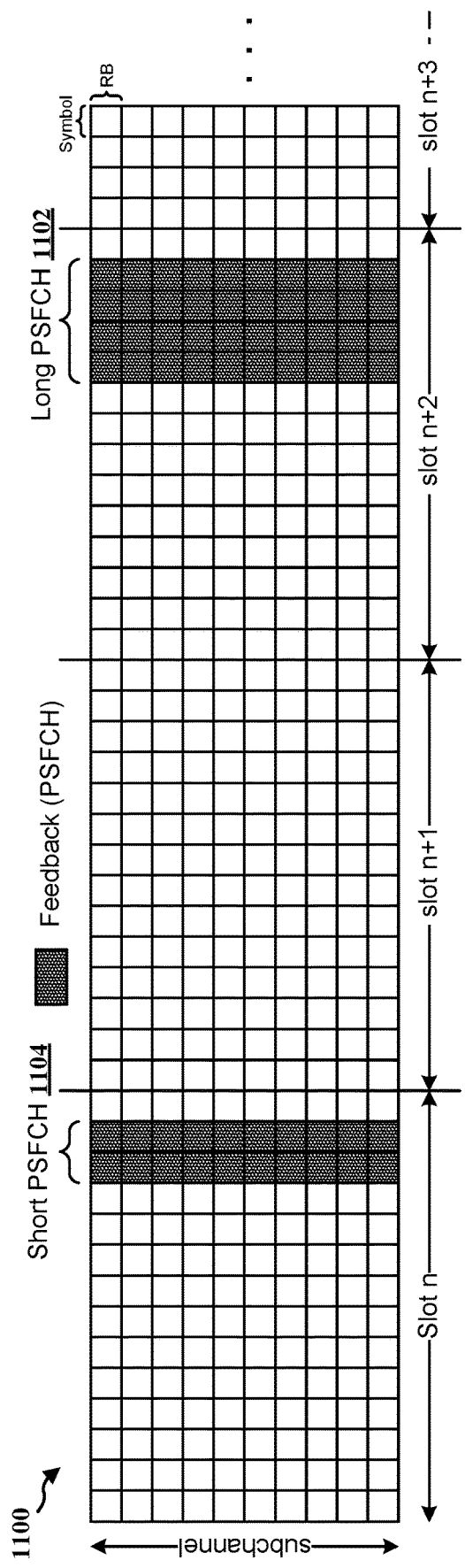
FIGS. 11A and 11B are diagrams illustrating an example sidelink resource pool that provides or is associated with PSFCH with long PSFCH format or PSFCH with short PSFCH format according to aspects of the present disclosure.

FIG. 11A is a diagram 1100 illustrating an example sidelink resource pool that provides or is associated with PSFCH with long PSFCH format or PSFCH with short PSFCH format. For purpose of the present disclosure, a PSFCH with long PSFCH format may be referred to as a "long PSFCH" or a "long format PSFCH," and a PSFCH with short PSFCH format may be referred to as a "short PSFCH" or a "short format PSFCH" throughout the specification. As shown by diagram 1100 of FIG. 11A, a long PSFCH 1102 may occupy more than two (2) symbols within a slot and a short PSFCH 1104 may occupy less than two symbols in a slot (e.g., one (1) or two (2) symbols). For example, in a slot containing fourteen symbols, the long PSFCH 1102 may occupy three to fourteen symbols (i.e., the entire slot), and in a slot containing twenty symbols, the long PSFCH 1102 may occupy three to twenty symbols, etc. Thus, the size of the long PSFCH 1102 may be within a range of X to Y symbols, where X>2 and Y≤number of symbols in a slot. A sidelink device may use one or more symbols within the long PSFCH 1102 or the short PSFCH 1104 for transmitting the HARQ feedback. For example, for a long PSFCH (e.g., 1104) with four (4) symbols, a sidelink device may use three (3) symbols or all four symbols for transmitting the HARQ feedback, where one symbol may be the HARQ feedback and other symbols may be the repetitions of the HARQ feedback. When more symbols are available and used for transmitting the HARQ feedback, the reliability of the HARQ feedback (e.g., the likelihood the HARQ feedback being successfully transmitted to another sidelink device) may increase and improve. In some example, the long PSFCH 1102 may occupy more than one slot, where the long PSFCH 1102 may be multiple-slots long, e.g., two (2) slots, three (3) slots, etc.

Figure 11B:
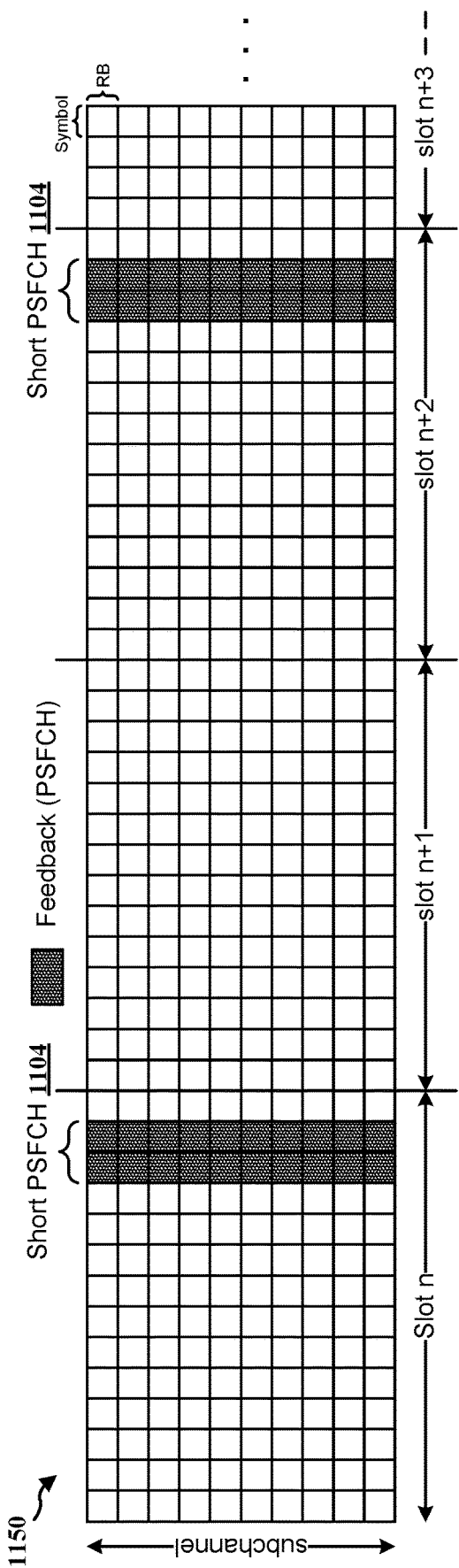

FIG. 11B is a diagram 1150 illustrating an example sidelink resource pool that provides or is associated with short PSFCH 1104 without the long PSFCH. Each PSFCH 1104 within the sidelink resource pool may occupy one (1) or two (2) symbols. One or more system-wide parameters with periodicity (e.g., sl-PSFCH-Period-r16) may apply to the resource pool and/or the short PSFCH 1104. For example, the short PSFCH 1104 may be configured with a periodicity of two (s) slots, such that a short PSFCH 1104 is available in every two slots (e.g., at slot n, slot n+2, slot n+4, slot n+6, etc.).

In one example, the size of the long PSFCH 1102 and optionally its periodicity may be defined for sidelink devices (e.g., UEs, transmitting UEs, receiving UEs) and/or configured for sidelink devices through radio resource control (RRC) configuration, such as using an RRC information element (IE) for sidelink long PFSCH configuration (e.g., sl-Long-PSFCH-Config). The long PSFCH 1102 may be configured to be available (e.g., visible) to a set of sidelink devices (e.g., sidelink devices with higher UE capabilities), and may be configured to be unavailable (e.g., invisible) to another set of sidelink devices (e.g., sidelink devices with lower UE capabilities). In another example, the long PSFCH 1102 may be configured for sidelink devices through a separate resource pool with long PSFCH format (i.e., without short PSFCH), e.g., in an IIoT private network with dedicated spectrum.

Referring back to FIG. 11A, as shown by diagram 1100, the long PSFCH 1102 and the short PSFCH 1104 may coexist in a same resource pool. Thus, a sidelink device (e.g., a sidelink UE) may be configured to use either the long PSFCH 1102 and the short PSFCH 1104 depending on one or more conditions. For example, for a transmission that has a higher/stringent reliability specification (e.g., E2E reliability of $10^{-6}$), the sidelink device may be configured to use the long PSFCH 1102 in the resource pool. For a transmission that has a lower reliability specification and/or has more data (e.g., PSSCH) to be transmitted, the sidelink device may be configured to use the short PSFCH 1104 in the resource pool to conserve the sidelink resources.

In one aspect of the present disclosure, for the long PSFCH (e.g., 1102) to coexist with the short PSFCH (e.g., 1104) in a resource pool, the long PSFCH may override (e.g., have priority over) the short PSFCH in the resource pool. For example, as shown by diagram 1150 of FIG. 11B, a resource pool may be configured with short PSFCH 1104 with a periodicity of two (2) slots, where a two-symbols long PSFCH may be available at slot n, slot n+2, slot n+4, slot n+6 and so on. Then, as shown by diagram 1200 of FIG. 12, the long PSFCH 1102 may be configured for the resource pool by using additional resources 1106 (e.g., symbol(s)) in one or more slots where short PSFCHs 1104 are configured. For example, at slot n+2, additional resources 1106 (e.g., two symbols) may be configured for PSFCH, thereby turning a short PSFCH 1104 with two symbols into a long PSFCH 1102 with four symbols. Similarly, at slot n+6, additional resources 1106 may be configured for PSFCH to turn the short PSFCH 1104 into the long PSFCH 1102. The additional resources 1106 may be any resources within the slot that are not occupied by the short PSFCH 1104, and the additional resources 1106 may be or may not be consecutive to the short PSFCH 1104. For example, the short PSFCH 1104 may occupy last two symbols of a slot within 14 symbols (e.g., occupy the $13^{th}$ and $14^{th}$ symbols). In one example, the additional resources 1106 may occupy one or more symbols preceding the short PSFCH 1104, such as at the $11^{th}$ and the $12^{th}$ symbols. In another example, the additional resources 1106 may occupy one or more symbols that are not consecutive to the short PSFCH 1104, such as at the $1^{st}$ and $2^{nd}$ symbols of the slot, the $2^{nd}$ and $5^{th}$ symbols of the slot, or the $1^{st}$, $3^{rd}$, $5^{th}$ and $7^{th}$ symbols of the slot, etc. The long PSFCH 1102 may also be configured with a periodicity that is the same as the short PSFCH 1104 (e.g., both with a periodicity of two slots, three slots, etc.)

As the long PSFCH 1102 may use additional resources 1106 within slots with short PSFCH 1104, the periodicity of the long PSFCH 1102 may be an integer multiple of the short PSFCH 1104. For example, if the short PSFCH 1104 has a periodicity of two (2) slots (e.g., at slot n, slot n+2, slot n+4, slot n+6, slot n+8 and so on) in a resource pool, the long PSFCH 1102 may be configured with a periodicity of four (4) slots (e.g., at slot n, slot n+4, slot n+8, slot n+12 and so on) in the source pool, which is an integer multiple of the short PSFCH 1104. Thus, if the long PSFCH 1102 is prioritized over (e.g., overrides) the short PSFCH 1104, the resource pool may include long PSFCH 1102 at slots n, n+4, n+8 and so on, and the resource pool may include short PSFCH 1104 at slots n+2, n+6, n+10 and so on. In another example, the short PSFCH 1104 may have a periodicity of two slots (e.g., at slot n, slot n+2, slot n+4, slot n+6, slot n+8 and so on) in a resource pool and the long PSFCH 1102 may be configured to have a periodicity of six (6) slots (e.g., at slot n, slot n+6, slot n+12, and so on) in the source pool, which is an integer multiple of the short PSFCH 1104. Thus, if the long PSFCH 1102 is prioritized over (e.g., overrides) the short PSFCH 1104, the resource pool may include long PSFCH 1102 at slots n, n+6, n+12 and so on, and the resource pool may include short PSFCH 1104 at slots n+2, n+4, n+8, n+10 and so on. In other words, some symbols that are used for data (e.g., PSSCH) may be used by the sidelink device for transmitting HARQ feedback (e.g., PSFCH).

Figure 13:
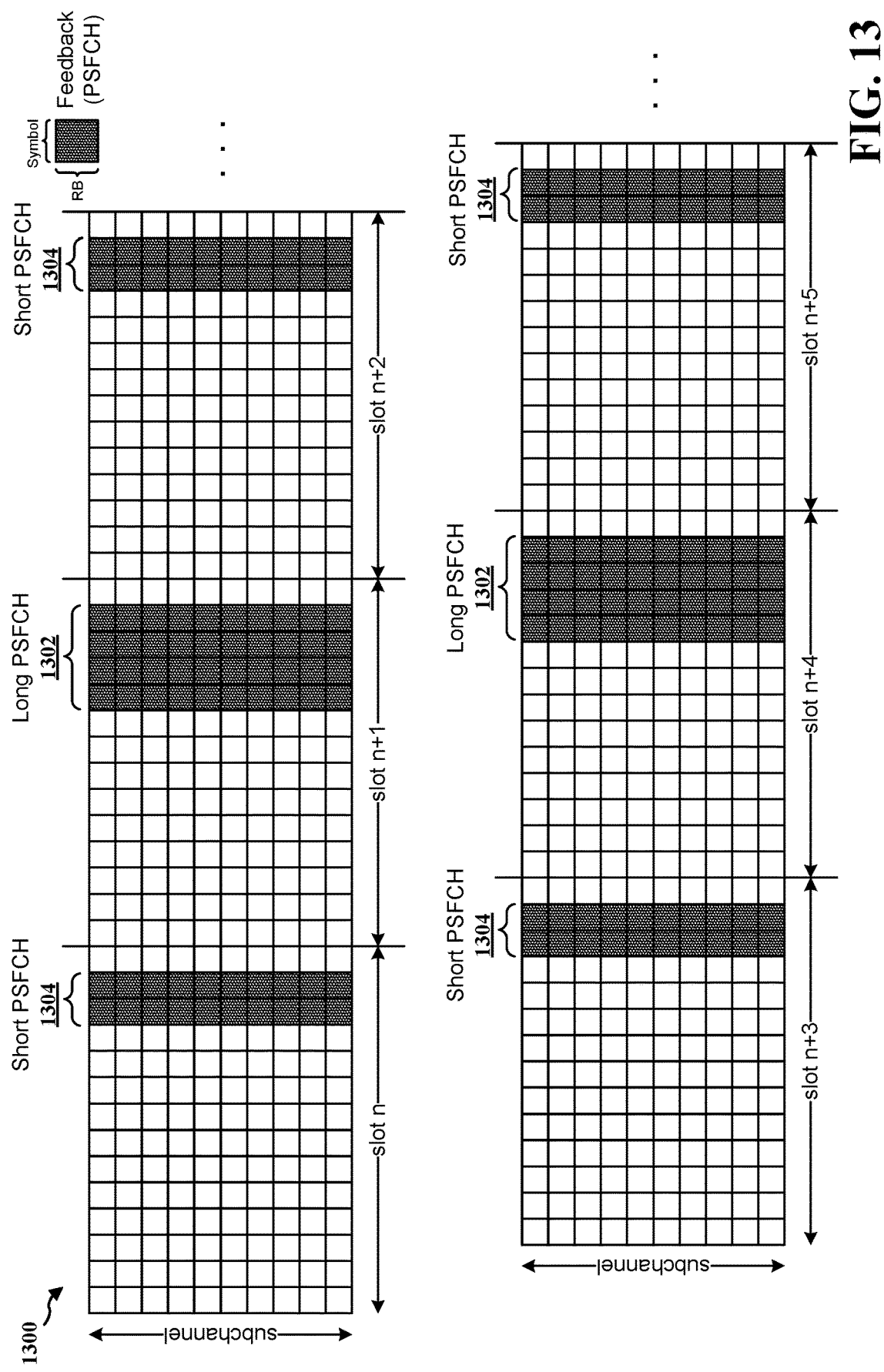
FIG. 13 is a diagram illustrating an example of scheduling long PSFCH in slots not occupied by short PSFCH according to aspects of the present disclosure.

In another aspect of the present disclosure, for long PSFCH to coexist with short PSFCH in a resource pool, the long PSFCH may be configured in slots that are not occupied by the short PSFCH. FIG. 13 is a diagram 1300 showing an exampling of configuring the long PSFCH in slots that are not occupied by short PSFCH. A resource pool may be configured with short PSFCH 1304 that has a periodicity of two (2) slots (e.g., at slot n, slot n+2, slot n+4, slot n+6, slot n+8 and so on), such as shown by the diagram 1150 of FIG. 11B. Then, long PSFCH 1302 may be configured in slots that are not occupied by the short PSFCH 1304 (e.g., at slot n+1, slot n+3, slot n+5, slot n+7 and so on). The long PSFCH and the short PSFCH may have the same periodicity (e.g., 2 slots).

At times, long PSFCH may be configured/scheduled in a same slot as short PSFCH. For example, as shown by diagram 1400 of FIG. 14, a sidelink resource pool may be configured with a short PSFCH 1404 with a periodicity of two (2) slots at slot n, slot n+2, slot n+4, slot n+6 and so on. The sidelink resource pool may also be configured with a long PSFCH 1402 with a periodicity of three (3) slots at slot n+4, slot n+7 and so on. As shown at 1408, the long PSFCH 1402 may overlap with the short PSFCH 1404 at slot n+4 (and also at slots n+10, n+16, etc.).

In one example, when the long PSFCH 1402 and the short PSFCH 1404 overlaps in a slot, a sidelink device may determine whether to use the long PSFCH 1402 or the short PSFCH 1404 in that slot based on the periodicity associated with the long PSFCH 1402 and the short PSFCH 1404. For example, the sidelink device may determine to use a PSFCH format that has a longer periodicity. Thus, if the long PSFCH 1402 has a longer periodicity (e.g., 3 slots) than the short PSFCH 1404 (e.g., 2 slots), the sidelink device may determine to use the long PSFCH 1402 for that slot. Alternatively, the sidelink device may determine to use a PSFCH format that has a shorter periodicity. Thus, the sidelink device may determine to use the short PSFCH 1404 for that slot instead.

In another example, when the long PSFCH 1402 and the short PSFCH 1404 overlaps in a slot, a sidelink device may determine whether to use the long PSFCH 1402 or the short PSFCH 1404 in that slot based on HARQ feedback repetition(s). For example, referring back to FIG. 14, a receiving sidelink device may be configured to provide a HARQ feedback using eight (8) symbols and within three consecutive slots. If the receiving sidelink device is transmitting the HARQ feedback using slots n+2, n+3 and n+6, as there may be one short PSFCH 1404 in slots n+2 and n+3, the receiving sidelink device may determine to use long PSFCH for slot n+4, such as by using a long PSFCH with six (6) symbols to meet the eight symbols HARQ transmission/retransmission specification. In other words, the sidelink device may ensure HARQ repetition factor K (e.g., number of HARQ repetitions) is possible across N slots.

In another aspect of the present disclosure, the long PSFCH (e.g., 1102, 1302, 1402) may be configured in subchannels and/or slots that may be used by a set of sidelink devices (e.g., UEs with higher capabilities), and the same subchannels and/or slots may be inaccessible for another set of sidelink devices (e.g., UEs with lower capabilities). This may avoid or prevent certain group/class of UEs from using the long PSFCH for PSSCH transmission. In other words, if a slot is configured with a long PSFCH, the network may configure the slot to be inaccessible/invisible to sidelink devices that are unable to transmit HARQ feedback using long PSFCH.

After a sidelink device is configured with a short PSFCH or a long PSFCH for reporting HARQ feedbacks, the sidelink device may use at least one symbol within the short PSFCH or the long PSFCH for transmitting a HARQ feedback, and may use other or rest symbols for HARQ feedback retransmissions.

Figure 15:
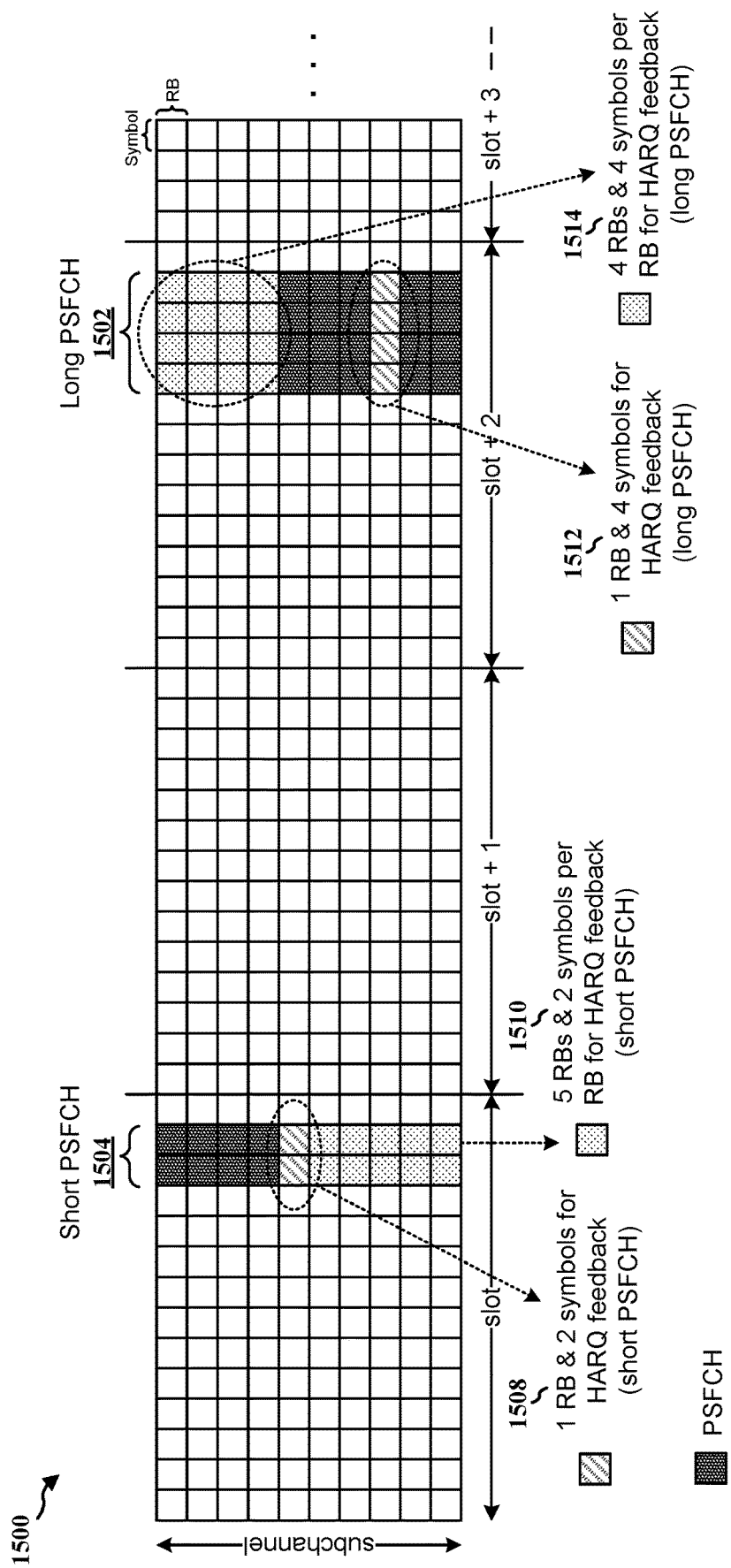
FIG. 15 is a diagram illustrating example HARQ reporting via short and long PSFCH format.

FIG. 15 is a diagram 1500 illustrating example HARQ reporting via short and long PSFCH format. In one aspect, when a short PSFCH 1504 is configured for a sidelink device, the sidelink may transmit the HARQ feedback using a waveform similar to PUCCH format 0. For example, as shown at 1508, the transmitting device may use one (1) RB and two (2) symbols for transmitting the HARQ feedback, where one symbol and one RB may include the HARQ feedback and another symbol and RB may include the repetition/duplication of the HARQ feedback. In another example, as shown at 1510, the transmitting device may use multiple RBs and one/two symbols for transmitting the HARQ feedback. For example, the transmitting device may use five (5) RBs and two symbols per RB for transmitting the HARQ feedback, where one or more RBs of a symbol may include the HARQ feedback and one or more RBs of another symbol may include the repetition/duplication of the HARQ feedback. By using more RBs for transmitting the HARQ feedback, the reliability for sidelink HARQ reporting may be improved.

In another aspect, when a long PSFCH 1502 is configured for a sidelink device, the sidelink may transmit the HARQ feedback based at least in part on the subchannel size and/or number of symbols X ($1 \le X \le$ number of symbols for PSFCH). For example, the transmitting device may use one RB and X symbols for transmitting the HARQ feedback and its repetitions (e.g., for PUCCH format 1 and PUCCH format 4), and/or the transmitting device may use Y RBs ($1 \le Y \le$ number of RBs in the subchannel) and X symbols for transmitting the HARQ feedback and its repetitions (e.g., for PUCCH format 3). When Y RBs and X symbols (e.g., for PUCCH format 3) are used for transmitting the HARQ feedback in a slot, the sidelink device may also apply modulation, error control coding, and/or cyclic redundancy check (CRC) to the transmission to improve the decoding of the transmission. In one example, while PUCCH format 1 and format 4 may use one RB and X symbols, they may use different waveform. For example, for the PUCCH format 1, the sequence may be repeated across symbols, whereas for PUCCH format 4, error controls and DMRS may be included as there are more bits (e.g., PUCCH format 0 may carry 1-2 bits). As such, the sidelink device may use a waveform that is different from a sequence based waveform for transmitting the HARQ feedback. For example, referring back to FIG. 15, if the long PSFCH 1502 with four symbols is configured for a sidelink device, as shown at 1512, the sidelink device may use one RB and X symbols for transmitting the HARQ feedback and its repetitions. As shown at 1514, the sidelink device may also use Y RBs and X symbols for transmitting the HARQ feedback and its repetitions, where the sidelink device may additionally or optionally apply modulation, error control coding, and/or CRC to the transmission. Additionally, or optionally, the sidelink device may further multiplex one or more control messages with the HARQ feedback when long PSFCH is configured for the transmitting device. For example, the HARQ feedback may be multiplexed with channel state information (CSI) report, scheduling request (SR), and/or buffer status report, etc. as the payload size for the PSFCH is increased, which enables the UE to report/include more messages.

In another aspect of the present disclosure, a transmitting sidelink device may indicate, either explicitly or implicitly, to a receiving device whether to use a long PSFCH or a short PSFCH and/or which PUCCH format (or Y RBs and X symbols resources) is to be used for transmitting the HARQ feedback.

For example, the transmitting device may explicitly indicate to the receiving device whether to use the long or the short PSFCH via the first SCI part (SCI-1), such as using the PSFCH overhead indicator bit(s) or reserved bit(s), etc. The transmitting device may also explicitly indicate to the receiving device via the second SCI part (SCI-2) and/or via upper layer(s) (e.g., through logical channels). In another example, the transmitting device may implicitly indicate to the receiving device whether to use the long or the short PSFCH based at least on the priority of the traffic/data, e.g., long PSFCH is used when the priority of the traffic/data is larger than a threshold. The priority of the traffic/data may be included in the SCI-1. In another example, the transmitting device may implicitly indicate to the receiving device whether to use the long or the short PSFCH based at least on the modulation and coding scheme (MCS) associated with the transmission (e.g., MCS used by the transmitting device for transmitting the traffic/data). For example, the receiving device may use long PSFCH when the MCS used for the traffic/data is below than a threshold as a low MCS may indicate that the channel condition is not in a good condition. Thus, more resources (e.g., the long PSFCH) may be used for the HARQ feedback to improve the reliability of the HARQ feedback. The MCS used for the traffic/data may also be included in the SCI-1. In another example, the transmitting device may implicitly indicate to the receiving device whether to use the long or the short PSFCH based at least on quality of service (QoS) associated with the traffic/data or an event that triggers the long/short PSFCH reporting, e.g., use longer PSFCH format for retransmissions. For example, the receiving device may use short PSFCH for transmitting the HARQ feedback in a slot (e.g., a first slot) and use long PSFCH for transmitting the retransmission of the HARQ feedback at different slots (e.g., a second slot, a third slot, etc.). Since the HARQ feedback is a retransmission, the receiving device may use a longer PSFCH such that the likelihood for the transmitting device to receive the HARQ feedback is increased.

In another aspect, a receiving device may determine whether to use long PSFCH or short PSFCH based on slot aggregation associated with the HARQ feedback. At times, the receiving device may be configured to transmit the HARQ feedback in multiple slots, e.g., a multi-slot PSFCH transmission with ACK/NACK repetition(s). For example, if a HARQ feedback is configured to be transmitted using eight (8) symbols in three slots, the receiving device may use short PSFCH for one or two slots, and use long PSFCH for rest slot(s). Thus, there are eight symbols of PSFCH available for the receiving device to provide the HARQ reporting. The RB selections for the slot aggregation may or may not include inter-slot hopping.

As describe in connection with FIG. 9, a timing gap K may be configured for the PSFCH resources, where the timing gap may indicate a duration between a slot carrying a PSSCH and a corresponding slot that is configured with the PSFCH resources for providing the HARQ feedback for the PSSCH. For example, when a receiving device receives a PSSCH in slot n, the receiving device may transmit a corresponding HARQ feedback through a PSFCH resources in slot (n+K). In some examples, the HARQ return time may depend on a minimum time gap (e.g., minTimeGap) and a PSFCH periodicity. The minimum time gap may be one or more slots (e.g., 2, 3, 4 slots, etc.). For example, if a PSSCH is received by a receiving device at slot n, and there is a minimum time gap of 2 slots and the PSFCH periodicity is 4 slots, the receiving device may transmit the corresponding HARQ feedback at slot n+3 (e.g., the fourth slot which satisfies both the minimum time gap and the PSFCH periodicity).

In one aspect of the present disclosure, if a receiving device is configured to transmit HARQ reporting using long PSFCH in a resource pool including both short PSFCH and long PSFCH, the receiving device may report the HARQ feedback based on a minimum time gap (e.g., minTimeGap) and the periodicity/availability of the long PSFCH. For example, if a PSSCH is received by a receiving device at slot n, and there is a minimum time gap of three (3) slots and the periodicity of the long PSFCH is two (2) slots (e.g., at slots n, n+2, n+4, n+6 and so on), the receiving device may transmit the corresponding HARQ feedback at slot n+4.

In another aspect of the present disclosure, if a receiving device is configured to transmit HARQ reporting using short PSFCH in a resource pool including both short PSFCH and long PSFCH, the receiving device may report the HARQ feedback based on a minimum time gap and the periodicity/availability of the short PSFCH. For example, if a PSSCH is received by a receiving device at slot n, and there is a minimum time gap of two slots and the short PSFCH periodicity is two slots (e.g., at slots n+1, n+3, n+5, n+7 and so on), the receiving device may transmit the corresponding HARQ feedback at slot n+3.

Figure 16:
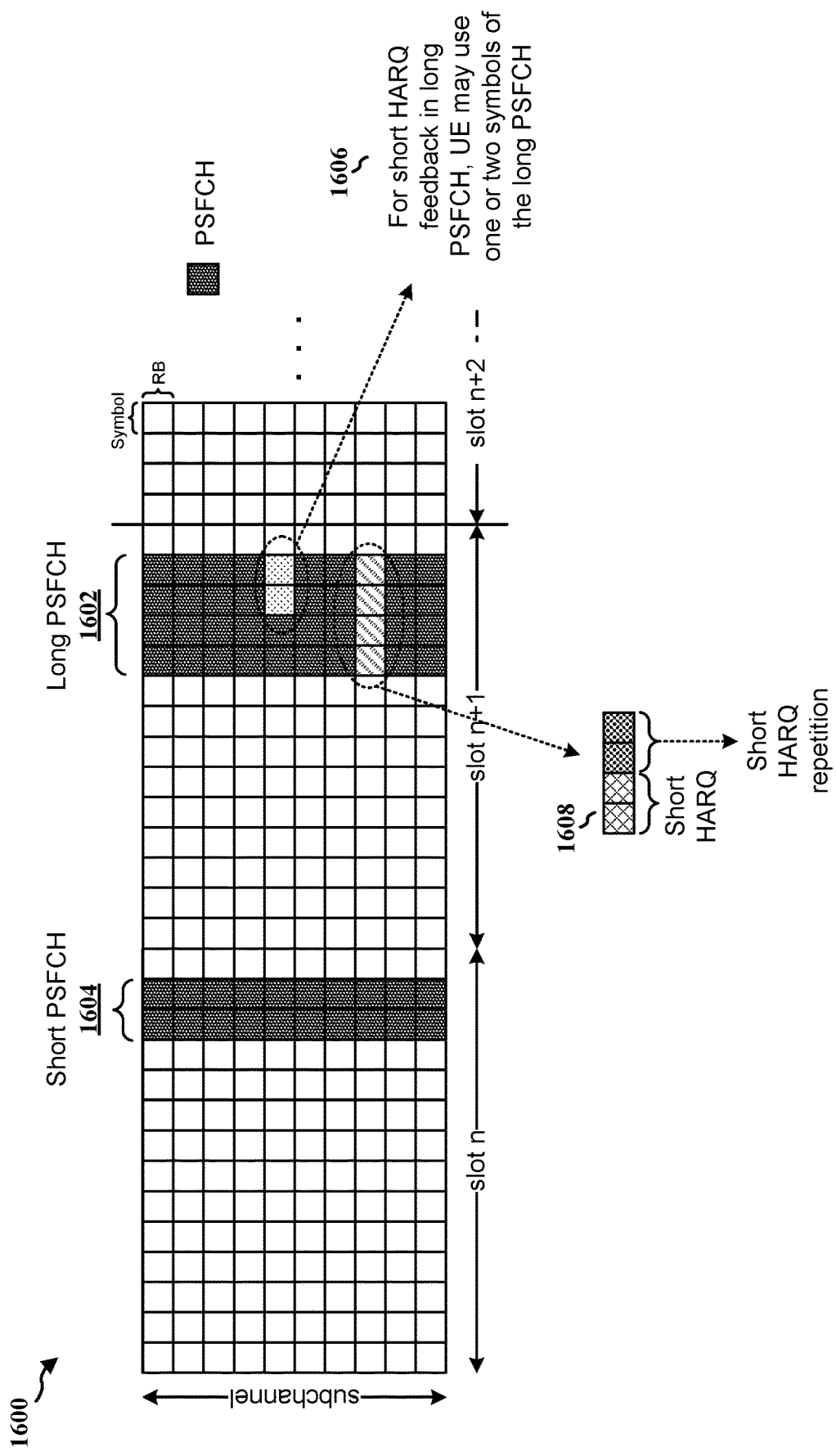
FIG. 16 is a diagram illustrating an example of transmitting HARQ reporting using short PSFCH in a resource pool including both short PSFCH and long PSFCH.

In another aspect of the present disclosure, if a receiving device is configured to transmit HARQ reporting using short PSFCH in a resource pool including both short PSFCH and long PSFCH, the receiving device may report the HARQ feedback based on a minimum time gap and the periodicity/availability of both the short PSFCH and the long PSFCH. FIG. 16 is a diagram 1600 illustrating an example of transmitting HARQ reporting using short PSFCH in a resource pool including both short PSFCH 1604 and long PSFCH 1602. In one example, as shown at 1606, if the receiving device determines to use long PSFCH 1602 to transmit a short-format HARQ (e.g., one or two symbols), the receiving device may use one or two symbols of the long PSFCH, such as the last two symbols. In other words, the receiving device may randomly select two symbols, e.g., the transmitting device may consider symbols 1 and 2 as a first candidate and symbols 3 and 4 as second candidate, then applying the resource selection based on a UE-ID. While such configuration may enable the receiving device to maintain same HARQ reporting behavior (e.g., using two symbols for HARQ reporting), there may be some signal power variation over the symbols in a slot as the HARQ reporting may be transmitted between PSSCH.

In another example, as shown at 1608, if the receiving device determines to use long PSFCH 1602 to transmit a short-format HARQ (e.g., one or two symbols), the receiving device may repeat the short-format HARQ over all symbols of the long PSFCH. For example, if the long PSFCH 1602 is four symbols long and the short format HARQ occupies two symbols, the receiving device may repeat the short-format HARQ two times in the long PSFCH 1602 (e.g., using all four symbols of the long PSFCH 1602). In another example, if the long PSFCH 1602 is six symbols long and the short format HARQ occupies two symbols, the receiving device may repeat the short-format HARQ three times in the long PSFCH 1602 (e.g., using all six symbols of the long PSFCH 1602), etc. The repeated transmission of short format HARQ using all symbols of the long PSFCH 1602 may be good for automatic gain control (AGC) calibration, and it may also improve the reception quality.

In some examples, the transmitting device may instruct the receiving device for a RB selection if the transmitting device expects resource collision may occur. For example, the transmitting device may instruct the receiving device to apply an offset in the RB selection.

In another aspect of the present disclosure, a receiving device may be configured to report HARQ feedback with slot aggregation, where the receiving device may report a HARQ feedback to a transmitting device through multiple slots, and the transmitting device may combine the HARQ feedback received from the multiple slots. For example, consecutive slots may be used for HARQ reporting with ultra-reliability, such as described in connection with FIG. 14.

Figure 17:
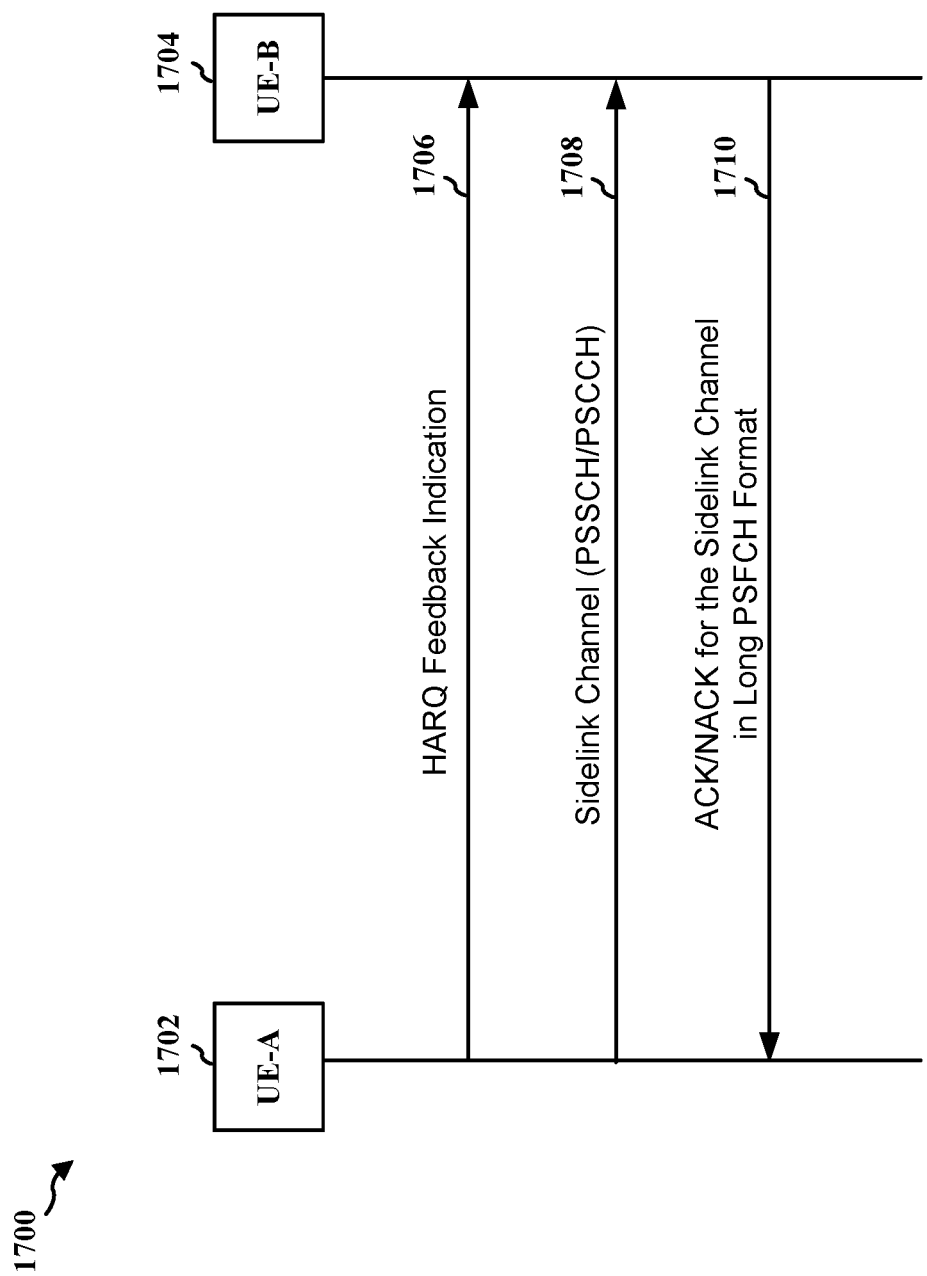
FIG. 17 is a communication flow between two sidelink devices according to aspects of the present disclosure.

FIG. 17 is a communication flow 1700 between a first UE 1702 (e.g., a transmitting UE) and a second UE 1704 (e.g., a receiving UE) for a sidelink communication according to aspects of the present disclosure. The communication flow 1700 illustrates how a receiving UE may provide HARQ feedback for a received sidelink channel using a PSFCH with long PSFCH format.

At 1706, the first UE 1702 may transmit an indication to provide HARQ feedback for at least one sidelink channel to the second UE 1704. The indication may be transmitted via SCI in PSCCH (e.g., SCI-1) or in PSSCH (e.g., SCI-2). In one example, the SCI may also indicate explicitly to the second UE 1704 to use the PSFCH including a long PSFCH format for providing the HARQ feedback. In another example, the first UE 1702 may inexplicit indicate to the second UE 1704 whether to use the long PSFCH format. For example, when the second UE 1704 transmits the ACK or the NACK in the PSFCH including a long PSFCH format or in a PSFCH including a short PSFCH format, the second UE 1704 may transmit the ACK or the NACK based on at least one of a priority, a MCS, a QoS, or a slot aggregation associated with the at least one sidelink channel.

At 1708, the first UE 1702 may transmit the at least one sidelink channel to the second UE 1704. The at least one sidelink channel may be a PSSCH or a PSCCH or both.

At 1710, in response to the indication and the received sidelink channel, the second UE 1704 may transmit an ACK or a NACK for the at least one sidelink channel via a PSFCH, where the PSFCH may include a long PSFCH format and may be associated with a sidelink resource pool. As described in connection with FIGS. 11A, 12 and 13, the long PSFCH format may include a length of at least three (3) symbols. In addition, the sidelink resource pool may support both the long PSFCH format including a length of at least three (3) symbols and a short PSFCH format including a length of less than three (3) symbols, as described in FIGS. 11A, 12-14.

Figure 12:
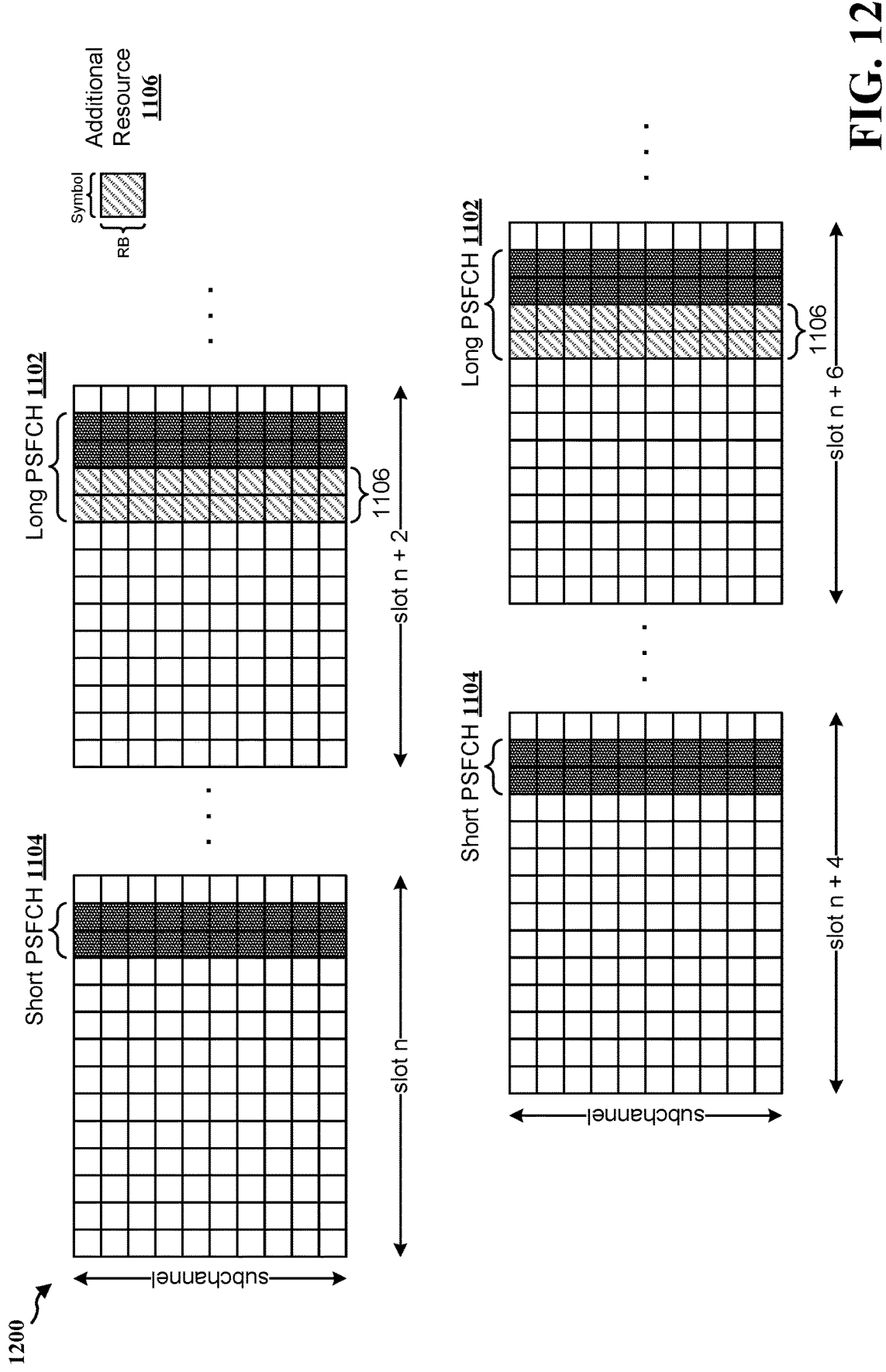
FIG. 12 is a diagram illustrating an example of long PSFCH overriding short PSFCH in a slot according to aspects of the present disclosure.

In one example, as described in connection with FIGS. 11A, 11B and 12, the long PSFCH format may be prioritized over the short PSFCH format when the PSFCH including the long PSFCH format and a PSFCH including the short PSFCH format are scheduled in a same slot in the sidelink resource pool. The PSFCH including the long PSFCH format may have a periodicity that is an integer multiple of the PSFCH including the short PSFCH format.

In another example, as described in connection with FIG. 13, the PSFCH including the long PSFCH format may be scheduled in one or more slots that are not occupied by the PSFCH including the short PSFCH format in the sidelink resource pool. The PSFCH including the long PSFCH format may also be scheduled in at least one of specified subchannel or specified slot that is not used by the PSFCH including the short PSFCH format.

Figure 14:
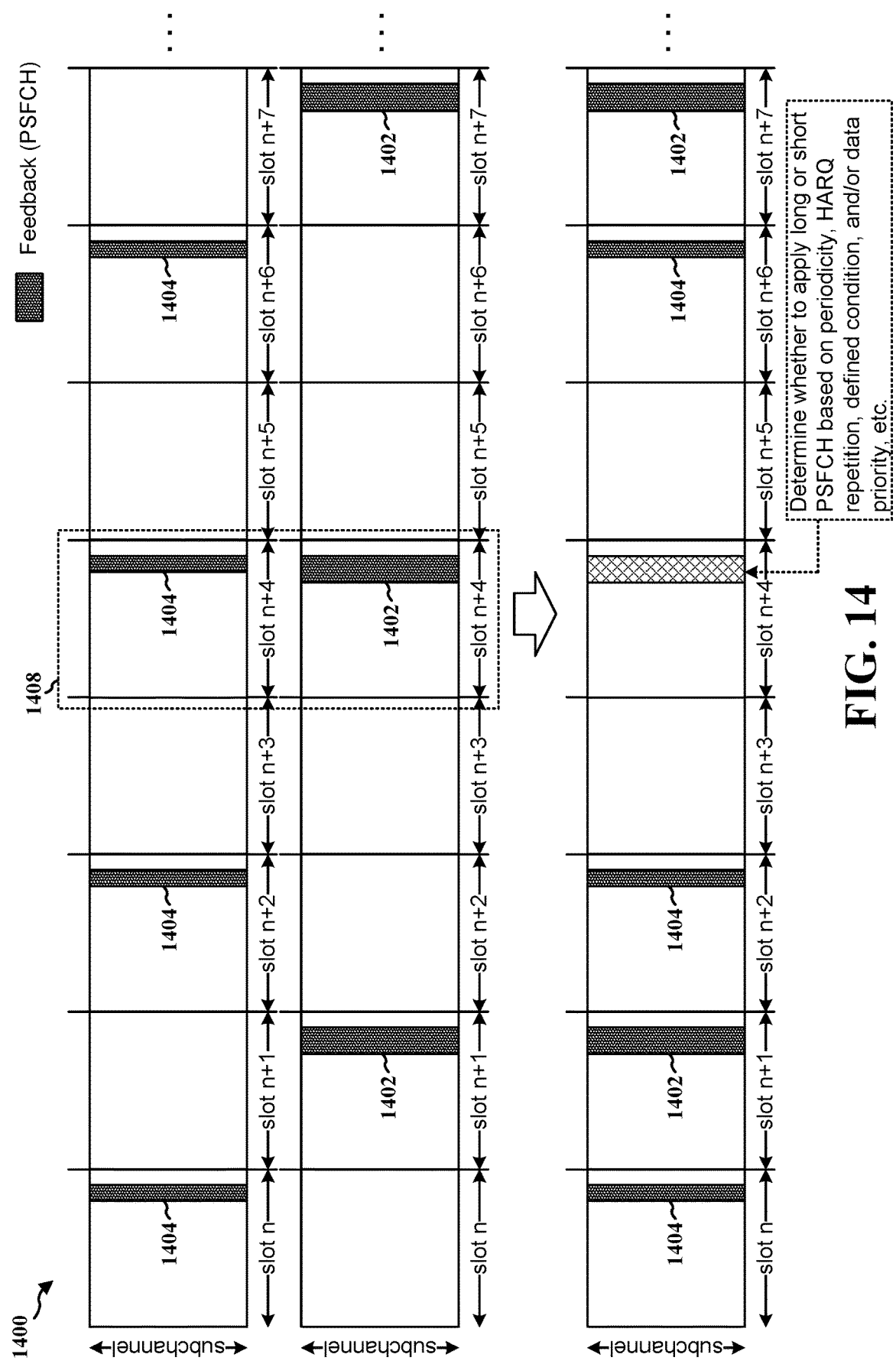
FIG. 14 is a diagram illustrating an example of determining whether to use long PSFCH or short PSFCH when they overlap in a same slot.

In another example, as described in connection with FIG. 14, when the PSFCH including the long PSFCH format is scheduled in a same slot as the PSFCH including the short PSFCH format in the sidelink resource pool, the PSFCH with a longer periodicity may be prioritized over the PSFCH with a shorter periodicity. Alternatively, or additionally, the PSFCH with a configured repetition resources may be prioritized over the PSFCH without configured repetition resources, where the configured repetition resources may be in consecutive slots.

As described in connection with FIGS. 15 and 16, the second UE 1704 may transmit the HARQ feedback (e.g., ACK/NACK) in one RB and at least three symbols in the PSFCH (e.g., as shown at 1512), or in multiple RBs and at least three symbols for each RB in the PSFCH (e.g., as shown at 1514). In one example, the second UE 1704 may also transmit at least one of a CSI report or a scheduling request in the PSFCH, e.g., the CSI report or the scheduling request is multiplexed with the HARQ feedback.

In another example, the second UE 1704 may transmit the ACK or the NACK after a time gap (e.g., a minimum time gap) and based on a periodicity of the PSFCH.

The transmitting UE 1704 may transmit the HARQ feedback using two or more symbols of the PSFCH when the long PSFCH format is used. For example, as described in connection with FIG. 16, the second UE 1704 may transmit the ACK or the NACK in a last two symbols of the PSFCH including the long PSFCH format (e.g., as shown at 1606). In another example, the second UE 1704 may transmit the ACK or the NACK in more than two symbols or all symbols of the PSFCH including the long PSFCH format when the second UE is configured to use a short PSFCH format (e.g., as shown at 1608). The second UE 1704 may transmit the ACK or the NACK in one (1) or two (2) symbols, where the ACK or the NACK may correspond to a HARQ repetition.

Figure 18:
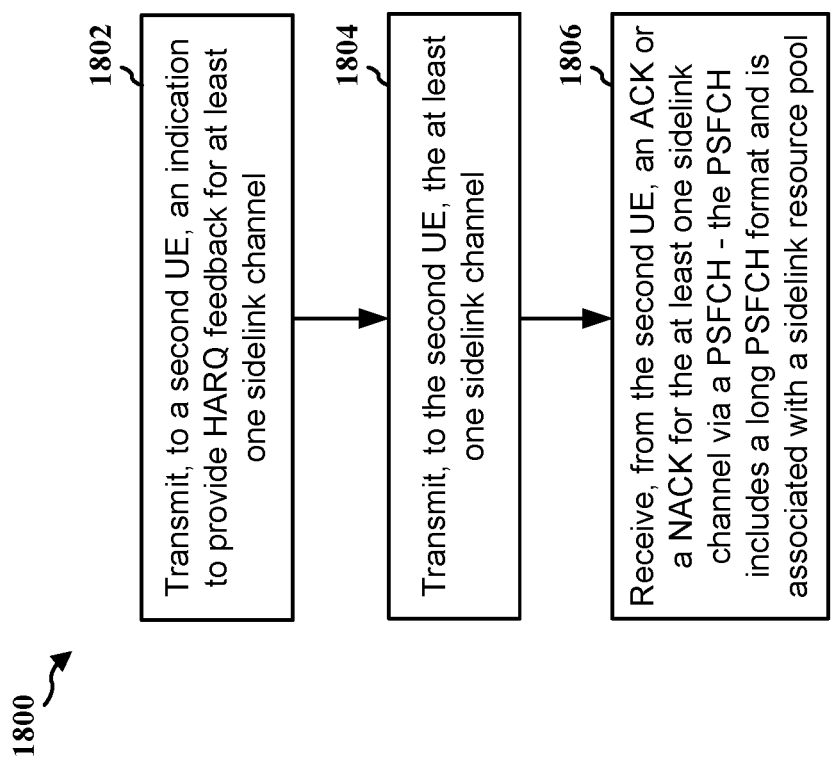
FIG. 18 is a flowchart of a method of wireless communication.

FIG. 18 is a flowchart 1800 of a method of wireless communication. The method may be performed by a first UE (e.g., a transmitting UE; the UE 104, 502, 504, 506, 508, 1702; the PLC 552; the apparatus 1902). The method may enable the first UE to receive HARQ feedback in PSFCH with long PSFCH format to improve the reliability of the HARQ feedback.

At 1802, the first UE may transmit, to a second UE, an indication to provide HARQ feedback for at least one sidelink channel, such as described in connection with FIG. 17. For example, at 1706, the first UE 1702 may transmit a HARQ feedback indication to the second UE 1704 requesting the second UE 1704 to provide HARQ feedback for at least one sidelink channel. The indication may be transmitted via SCI in PSCCH (e.g., SCI-1) or in PSSCH (e.g., SCI-2). In one example, the SCI may indicate explicitly to the second UE to use the PSFCH including a long PSFCH format for providing the HARQ feedback. In another example, the first UE may inexplicit indicate to the second UE whether to use the long PSFCH format. For example, when the second UE transmits the ACK or the NACK in the PSFCH including a long PSFCH format or in a PSFCH including a short PSFCH format, the second UE may transmit the ACK or the NACK based on at least one of a priority, a MCS, a QoS, or a slot aggregation associated with the at least one sidelink channel.

At 1804, the first UE may transmit, to the second UE, the at least one sidelink channel, such as described in connection with FIG. 17. For example, at 1708, the first UE 1702 may transmit sidelink channel (e.g., PSSCH/PSCCH) to the second UE 1704. The at least one sidelink channel may be a PSSCH or a PSCCH or both.

At 1806, the first UE may receive, from the second UE, an ACK or a NACK for the at least one sidelink channel via a PSFCH, the PSFCH including a long PSFCH format and associated with a sidelink resource pool, such as described in connection with FIG. 17. For example, at 1710, the first UE 1702 may receive the ACK/NACK for the transmitted sidelink channel from the second UE 1704. The long PSFCH format may include a length of at least three (3) symbols. In addition, the sidelink resource pool may support both the long PSFCH format including a length of at least three (3) symbols and a short PSFCH format including a length of less than three (3) symbols.

In one example, the long PSFCH format may be prioritized over (e.g., overrides) the short PSFCH format when the PSFCH including the long PSFCH format and a PSFCH including the short PSFCH format are scheduled in a same slot in the sidelink resource pool. The PSFCH including the long PSFCH format may have a periodicity that is an integer multiple of the PSFCH including the short PSFCH format.

In another example, the PSFCH including the long PSFCH format may be scheduled in one or more slots that are not occupied by the PSFCH including the short PSFCH format in the sidelink resource pool. The PSFCH including the long PSFCH format may also be scheduled in at least one of specified subchannel or specified slot that is not used by the PSFCH including the short PSFCH format.

In another example, when the PSFCH including the long PSFCH format is scheduled in a same slot as the PSFCH including the short PSFCH format in the sidelink resource pool, the PSFCH with a longer periodicity may be prioritized over the PSFCH with a shorter periodicity. Alternatively, or additionally, the PSFCH with a configured repetition resources may be prioritized over the PSFCH without configured repetition resources, where the configured repetition resources may be in consecutive slots.

The first UE may receive the HARQ feedback (e.g., ACK/NACK) in one RB and at least three symbols in the PSFCH, or in multiple RBs and at least three symbols for each RB in the PSFCH. In one example, the first UE may receive at least one of a CSI report or a scheduling request in the PSFCH. The first UE may receive the ACK or the NACK after a time gap (e.g., a minimum time gap) and based on a periodicity of the PSFCH.

The first UE may receive the HARQ feedback in two or more symbols of the PSFCH when the long PSFCH format is used. For example, the first UE may receive the ACK or the NACK in a last two symbols of the PSFCH including the long PSFCH format. In another example, the first UE may receive the ACK or the NACK in more than two symbols or all symbols of the PSFCH including the long PSFCH format when the second UE is configured to use a short PSFCH format. The first UE may receive the ACK or the NACK in one (1) or two (2) symbols, where the ACK or the NACK may correspond to a HARQ repetition.

Figure 19:
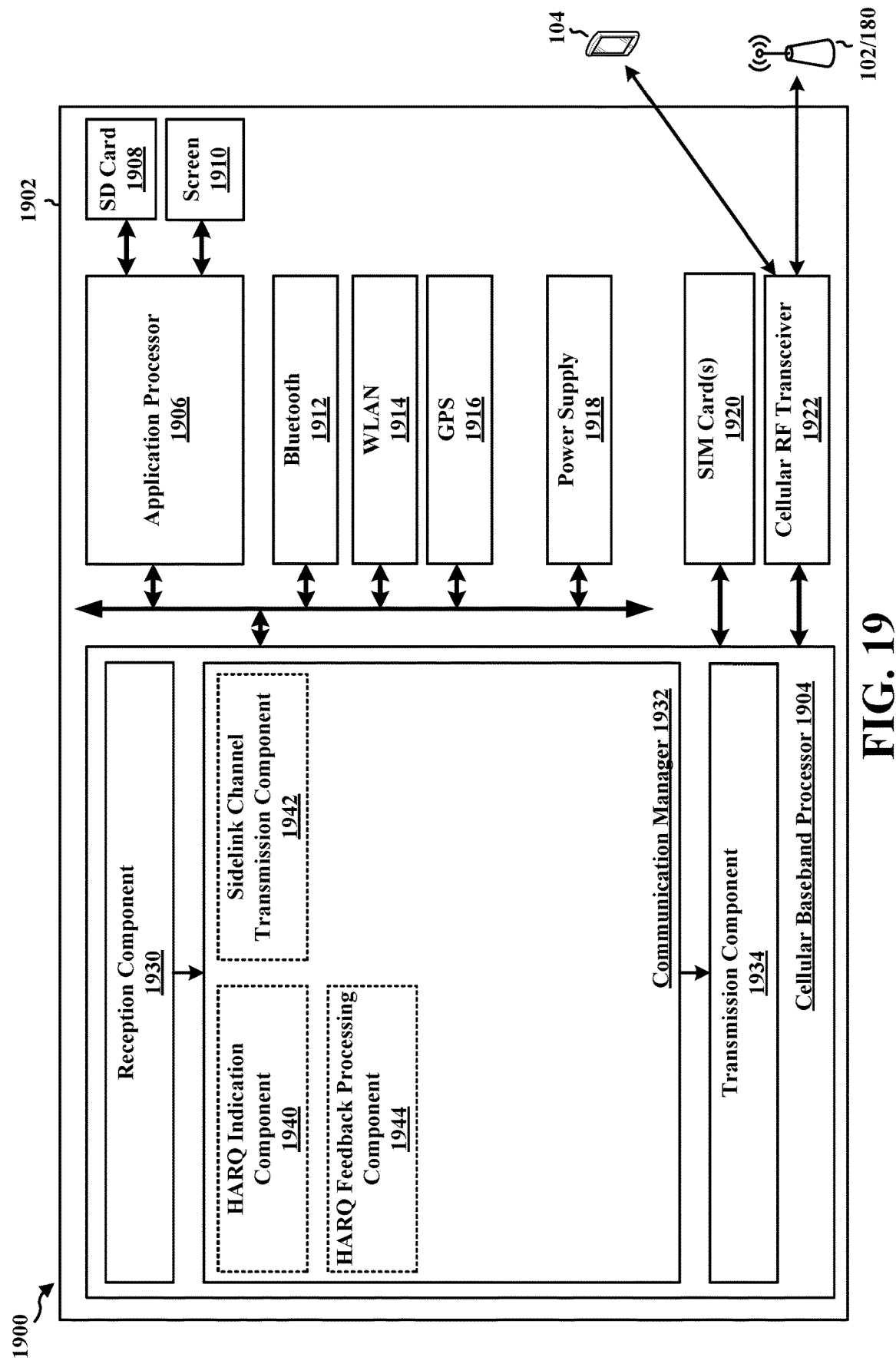
FIG. 19 is a diagram illustrating an example of a hardware implementation for an example apparatus.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the aforediscussed additional modules of the apparatus 1902.

The communication manager 1932 includes a HARQ indication component 1940 that is configured to transmit, to a second UE, an indication to provide HARQ feedback for at least one sidelink channel, e.g., as described in connection with 1802 of FIG. 18. The communication manager 1932 further includes a sidelink channel transmission component 1942 that is configured to transmit, to the second UE, the at least one sidelink channel, e.g., as described in connection with 1804 of FIG. 18. The communication manager 1932 further includes a HARQ feedback processing component 1944 that is configured to receive, from the second UE, an ACK or a NACK for the at least one sidelink channel via a PSFCH, the PSFCH including a long PSFCH format and associated with a sidelink resource pool, e.g., as described in connection with 1806 of FIG. 18.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the cellular baseband processor 1904, includes means for transmitting, to a second UE, an indication to provide HARQ feedback for at least one sidelink channel. The apparatus 1902 includes means for transmitting, to the second UE, the at least one sidelink channel. The apparatus 1902 includes means for receiving, from the second UE, an ACK or a NACK for the at least one sidelink channel via a PSFCH, the PSFCH including a long PSFCH format and associated with a sidelink resource pool. The indication may be transmitted via SCI in PSCCH (e.g., SCI-1) or in PSSCH (e.g., SCI-2). In one configuration, the SCI may indicate explicitly to the second UE to use the PSFCH including a long PSFCH format for providing the HARQ feedback. In another configuration, the HARQ feedback (e.g., the ACK or the NACK) is received based on at least one of a priority, a MCS, a QoS, or a slot aggregation associated with the at least one sidelink channel. The at least one sidelink channel may be a PSSCH or a PSCCH or both. The long PSFCH format may include a length of at least three symbols. In addition, the sidelink resource pool may support both the long PSFCH format including a length of at least three symbols and a short PSFCH format including a length of less than three symbols.

In one configuration, the long PSFCH format may be prioritized over the short PSFCH format when the PSFCH including the long PSFCH format and a PSFCH including the short PSFCH format are scheduled in a same slot in the sidelink resource pool. The PSFCH including the long PSFCH format may have a periodicity that is an integer multiple of the PSFCH including the short PSFCH format.

In another configuration, the PSFCH including the long PSFCH format may be scheduled in one or more slots that are not occupied by the PSFCH including the short PSFCH format in the sidelink resource pool. The PSFCH including the long PSFCH format may also be scheduled in at least one of specified subchannel or specified slot that is not used by the PSFCH including the short PSFCH format.

In another configuration, when the PSFCH including the long PSFCH format is scheduled in a same slot as the PSFCH including the short PSFCH format in the sidelink resource pool, the PSFCH with a longer periodicity may be prioritized over the PSFCH with a shorter periodicity. In another configuration, the PSFCH with a configured repetition resources may be prioritized over the PSFCH without configured repetition resources, where the configured repetition resources may be in consecutive slots.

The apparatus 1902 may include means for receiving the HARQ feedback (e.g., ACK/NACK) in one RB and at least three symbols in the PSFCH, or in multiple RBs and at least three symbols for each RB in the PSFCH. In one configuration, the apparatus 1902 may include means for receiving at least one of a CSI report or a scheduling request in the PSFCH. The ACK or the NACK may be received after a time gap and based on a periodicity of the PSFCH.

The apparatus 1902 may include means for receiving the HARQ feedback in two or more symbols of the PSFCH when the long PSFCH format is used. In configuration, the apparatus 1902 may receive the ACK or the NACK in a last two symbols of the PSFCH including the long PSFCH format. In another configuration, the apparatus 1902 may receive the ACK or the NACK in more than two symbols or all symbols of the PSFCH including the long PSFCH format when the second UE is configured to use a short PSFCH format. In another configuration, the apparatus 1902 may receive the ACK or the NACK in one (1) or two (2) symbols, where the ACK or the NACK may correspond to a HARQ repetition.

The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
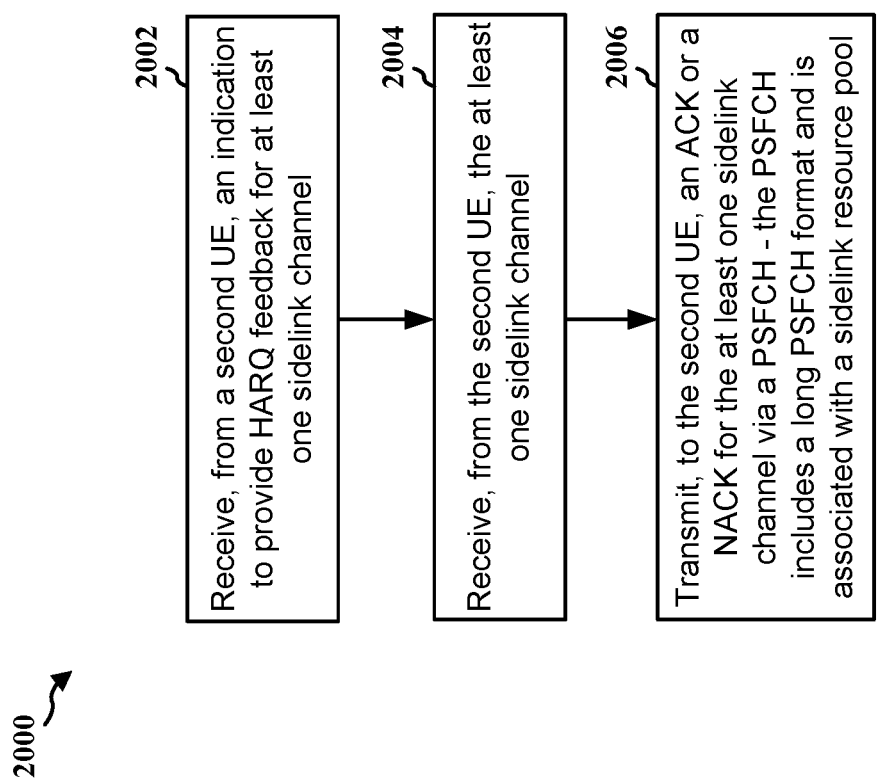
FIG. 20 is a flowchart of a method of wireless communication.

FIG. 20 is a flowchart 2000 of a method of wireless communication. The method may be performed by a first UE (e.g., a receiving UE; the UE 104, 502, 504, 506, 508, 1704; the SA 554, 556, 558; the apparatus 2102). The method may enable the first UE to provide HARQ feedback in PSFCH with long PSFCH format to improve the reliability of the HARQ feedback.

At 2002, the first UE may receive, from a second UE, an indication to provide HARQ feedback for at least one sidelink channel, such as described in connection with FIG. 17. For example, at 1706, the second UE 1704 may receive a HARQ feedback indication from the first UE 1702 requesting the second UE 1704 to provide HARQ feedback for at least one sidelink channel. The indication may be received via SCI in PSCCH (e.g., SCI-1) or in PSSCH (e.g., SCI-2). In one example, the SCI may indicate explicitly to the first UE to use the PSFCH including a long PSFCH format for providing the HARQ feedback. In another example, the second UE may inexplicit indicate to the first UE whether to use the long PSFCH format. For example, when the first UE transmits the ACK or the NACK in the PSFCH including a long PSFCH format or in a PSFCH including a short PSFCH format, the first UE may transmit the ACK or the NACK based on at least one of a priority, a MCS, a QoS, or a slot aggregation associated with the at least one sidelink channel.

At 2004, the first UE may receive, from the second UE, the at least one sidelink channel, such as described in connection with FIG. 17. For example, at 1708, the second UE 1704 may receive sidelink channel (e.g., PSSCH/PSCCH) from the first UE 1702. The at least one sidelink channel may be a PSSCH or a PSCCH or both.

At 2006, the first UE may transmit, to the second UE, an ACK or a NACK for the at least one sidelink channel via a PSFCH, the PSFCH including a long PSFCH format and associated with a sidelink resource pool, such as described in connection with FIG. 17. For example, at 1710, the second UE 1704 may transmit the ACK/NACK for the received sidelink channel to the first UE 1702. The long PSFCH format may include a length of at least three (3) symbols. In addition, the sidelink resource pool may support both the long PSFCH format including a length of at least three (3) symbols and a short PSFCH format including a length of less than three (3) symbols.

In one example, the long PSFCH format may be prioritized over the short PSFCH format when the PSFCH including the long PSFCH format and a PSFCH including the short PSFCH format are scheduled in a same slot in the sidelink resource pool. The PSFCH including the long PSFCH format may have a periodicity that is an integer multiple of the PSFCH including the short PSFCH format.

In another example, the PSFCH including the long PSFCH format may be scheduled in one or more slots that are not occupied by the PSFCH including the short PSFCH format in the sidelink resource pool. The PSFCH including the long PSFCH format may also be scheduled in at least one of specified subchannel or specified slot that is not used by the PSFCH including the short PSFCH format.

In another example, when the PSFCH including the long PSFCH format is scheduled in a same slot as the PSFCH including the short PSFCH format in the sidelink resource pool, the PSFCH with a longer periodicity may be prioritized over the PSFCH with a shorter periodicity. Alternatively, or additionally, the PSFCH with a configured repetition resources may be prioritized over the PSFCH without configured repetition resources, where the configured repetition resources may be in consecutive slots.

The first UE may transmit the HARQ feedback (e.g., ACK/NACK) in one RB and at least three symbols in the PSFCH, or in multiple RBs and at least three symbols for each RB in the PSFCH. In one example, the first UE may transmit at least one of a CSI report or a scheduling request in the PSFCH. The first UE may transmit the ACK or the NACK after a time gap (e.g., a minimum time gap) and based on a periodicity of the PSFCH.

The first UE may transmit the HARQ feedback in two or more symbols of the PSFCH when the long PSFCH format is used. For example, the first UE may transmit the ACK or the NACK in a last two symbols of the PSFCH including the long PSFCH format. In another example, the first UE may transmit the ACK or the NACK in more than two symbols or all symbols of the PSFCH including the long PSFCH format when the first UE is configured to use a short PSFCH format. The first UE may transmit the ACK or the NACK in one (1) or two (2) symbols, where the ACK or the NACK may correspond to a HARQ repetition.

Figure 21:
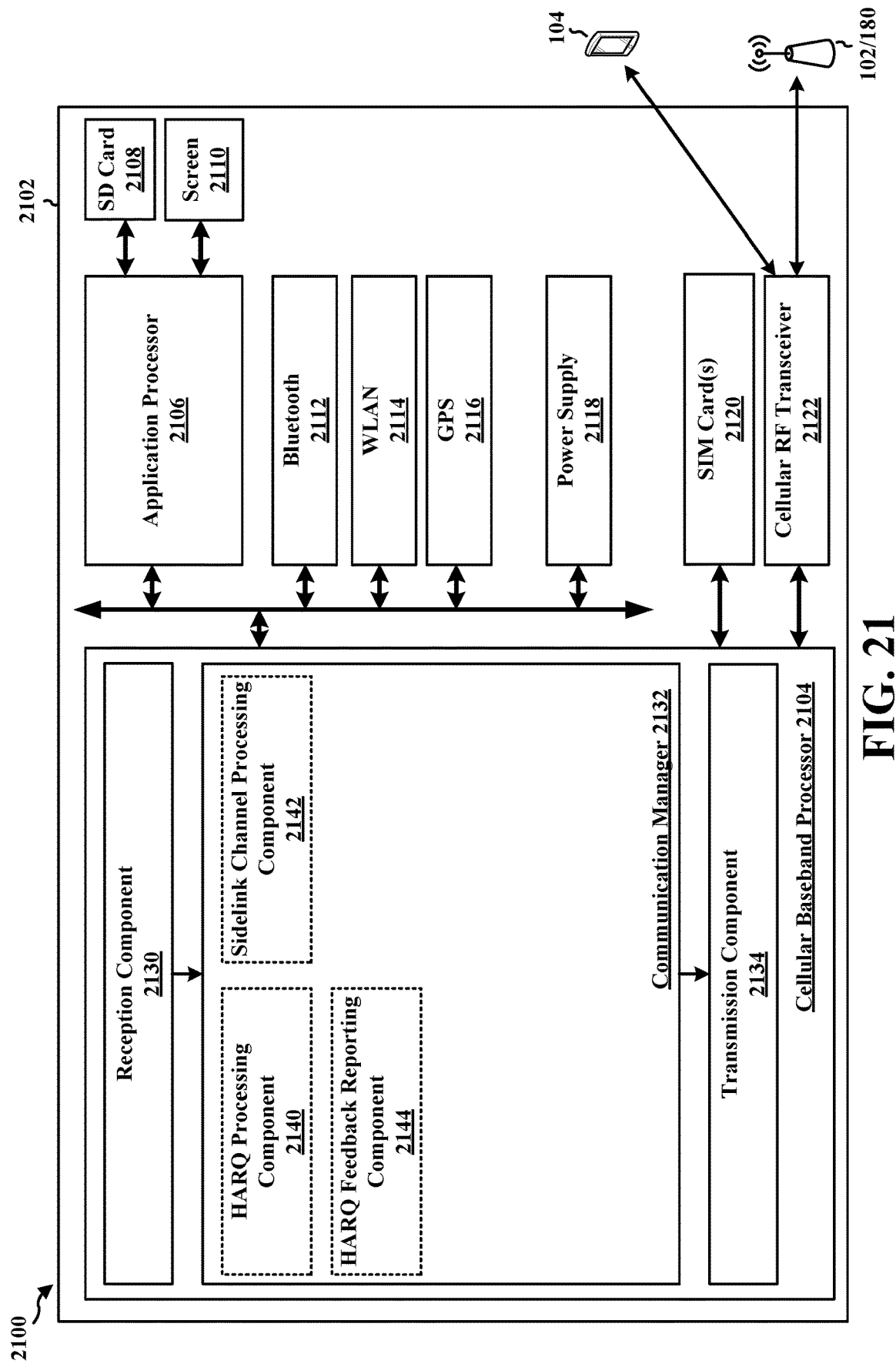
FIG. 21 is a diagram illustrating an example of a hardware implementation for an example apparatus.

FIG. 21 is a diagram 2100 illustrating an example of a hardware implementation for an apparatus 2102. The apparatus 2102 is a UE and includes a cellular baseband processor 2104 (also referred to as a modem) coupled to a cellular RF transceiver 2122 and one or more subscriber identity modules (SIM) cards 2120, an application processor 2106 coupled to a secure digital (SD) card 2108 and a screen 2110, a Bluetooth module 2112, a wireless local area network (WLAN) module 2114, a Global Positioning System (GPS) module 2116, and a power supply 2118. The cellular baseband processor 2104 communicates through the cellular RF transceiver 2122 with the UE 104 and/or BS 102/180. The cellular baseband processor 2104 may include a computer-readable medium/memory. The computer-readable medium/memory may be non-transitory. The cellular baseband processor 2104 is responsible for general processing, including the execution of software stored on the computer-readable medium/memory. The software, when executed by the cellular baseband processor 2104, causes the cellular baseband processor 2104 to perform the various functions described supra. The computer-readable medium/memory may also be used for storing data that is manipulated by the cellular baseband processor 2104 when executing software. The cellular baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the cellular baseband processor 2104. The cellular baseband processor 2104 may be a component of the UE 350 and may include the memory 360 and/or at least one of the TX processor 368, the RX processor 356, and the controller/processor 359. In one configuration, the apparatus 2102 may be a modem chip and include just the baseband processor 2104, and in another configuration, the apparatus 2102 may be the entire UE (e.g., see 350 of FIG. 3) and include the aforediscussed additional modules of the apparatus 2102.

The communication manager 2132 includes a HARQ processing component 2140 that is configured to receive, from a second UE, an indication to provide HARQ feedback for at least one sidelink channel, e.g., as described in connection with 2002 of FIG. 20. The communication manager 2132 further includes a sidelink channel processing component 2142 that is configured to receive, from the second UE, the at least one sidelink channel, e.g., as described in connection with 2004 of FIG. 20. The communication manager 2132 further includes a HARQ feedback reporting component 2144 that is configured to transmit, to the second UE, an ACK or a NACK for the at least one sidelink channel via a PSFCH, the PSFCH including a long PSFCH format and associated with a sidelink resource pool, e.g., as described in connection with 2006 of FIG. 20.

The apparatus may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the cellular baseband processor 2104, includes means for receiving, from a second UE, an indication to provide HARQ feedback for at least one sidelink channel. The apparatus 2102 includes means for receiving, from the second UE, the at least one sidelink channel. The apparatus 2102 includes means for transmitting, to the second UE, an ACK or a NACK for the at least one sidelink channel via a PSFCH, the PSFCH including a long PSFCH format and associated with a sidelink resource pool. The indication may be transmitted via SCI in PSCCH (e.g., SCI-1) or in PSSCH (e.g., SCI-2). In one configuration, the SCI may indicate explicitly to the apparatus 2102 to use the PSFCH including a long PSFCH format for providing the HARQ feedback. In another configuration, the HARQ feedback (e.g., the ACK or the NACK) is transmitted based on at least one of a priority, a MCS, a QoS, or a slot aggregation associated with the at least one sidelink channel. The at least one sidelink channel may be a PSSCH or a PSCCH or both. The long PSFCH format may include a length of at least three symbols. In addition, the sidelink resource pool may support both the long PSFCH format including a length of at least three symbols and a short PSFCH format including a length of less than three symbols.

In one configuration, the long PSFCH format may be prioritized over the short PSFCH format when the PSFCH including the long PSFCH format and a PSFCH including the short PSFCH format are scheduled in a same slot in the sidelink resource pool. The PSFCH including the long PSFCH format may have a periodicity that is an integer multiple of the PSFCH including the short PSFCH format.

In another configuration, the PSFCH including the long PSFCH format may be scheduled in one or more slots that are not occupied by the PSFCH including the short PSFCH format in the sidelink resource pool. The PSFCH including the long PSFCH format may also be scheduled in at least one of specified subchannel or specified slot that is not used by the PSFCH including the short PSFCH format.

In another configuration, when the PSFCH including the long PSFCH format is scheduled in a same slot as the PSFCH including the short PSFCH format in the sidelink resource pool, the PSFCH with a longer periodicity may be prioritized over the PSFCH with a shorter periodicity. In another configuration, the PSFCH with a configured repetition resources may be prioritized over the PSFCH without configured repetition resources, where the configured repetition resources may be in consecutive slots.

The apparatus 2102 may include means for transmitting the HARQ feedback (e.g., ACK/NACK) in one RB and at least three symbols in the PSFCH, or in multiple RBs and at least three symbols for each RB in the PSFCH. In one configuration, the apparatus 2102 may include means for transmitting at least one of a CSI report or a scheduling request in the PSFCH. The ACK or the NACK may be transmitted after a time gap and based on a periodicity of the PSFCH.

The apparatus 2102 may include means for transmitting the HARQ feedback in two or more symbols of the PSFCH when the long PSFCH format is used. In configuration, the apparatus 2102 may transmit the ACK or the NACK in a last two symbols of the PSFCH including the long PSFCH format. In another configuration, the apparatus 2102 may transmit the ACK or the NACK in more than two symbols or all symbols of the PSFCH including the long PSFCH format when the apparatus 2102 is configured to use a short PSFCH format. In another configuration, the apparatus 2102 may transmit the ACK or the NACK in one (1) or two (2) symbols, where the ACK or the NACK may correspond to a HARQ repetition.

The aforementioned means may be one or more of the aforementioned components of the apparatus 2102 configured to perform the functions recited by the aforementioned means. As described supra, the apparatus 2102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first UE, comprising: transmitting, to a second UE, an indication to provide HARQ feedback for at least one sidelink channel; transmitting, to the second UE, the at least one sidelink channel; and receiving, from the second UE, an ACK or a NACK for the at least one sidelink channel via a PSFCH, the PSFCH including a long PSFCH format and associated with a sidelink resource pool.

In aspect 2, the method of aspect 1 further includes that the long PSFCH format includes a length of at least three (3) symbols.

In aspect 3, the method of aspect 1 or aspect 2 further includes that the at least one sidelink channel is a PSSCH or a PSCCH or both.

In aspect 4, the method of any of aspects 1-3 further includes that the indication is transmitted via SCI in the PSCCH or the PSSCH.

In aspect 5, the method of any of aspects 1-4 further includes that the sidelink resource pool supports the long PSFCH format including a length of at least three (3) symbols and a short PSFCH format including a length of less than three (3) symbols.

In aspect 6, the method of any of aspects 1-5 further includes that the long PSFCH format is prioritized over the short PSFCH format when the PSFCH including the long PSFCH format and a PSFCH including the short PSFCH format are scheduled in a same slot in the sidelink resource pool.

In aspect 7, the method of any of aspects 1-6 further includes that the PSFCH including the long PSFCH format has a periodicity that is an integer multiple of the PSFCH including the short PSFCH format.

In aspect 8, the method of any of aspects 1-7 further includes that the PSFCH including the long PSFCH format is scheduled in one or more slots that are not occupied by the PSFCH including the short PSFCH format in the sidelink resource pool.

In aspect 9, the method of any of aspects 1-8 further includes that when the PSFCH including the long PSFCH format is scheduled in a same slot as the PSFCH including the short PSFCH format in the sidelink resource pool, the PSFCH with a longer periodicity is prioritized over the PSFCH with a shorter periodicity.

In aspect 10, the method of any of aspects 1-9 further includes that when the PSFCH including the long PSFCH format is scheduled in a same slot as the PSFCH including the short PSFCH format in the sidelink resource pool, the PSFCH with a configured repetition resources is prioritized over the PSFCH without configured repetition resources, where the configured repetition resources are in consecutive slots.

In aspect 11, the method of any of aspects 1-10 further includes that the PSFCH including the long PSFCH format is scheduled in at least one of specified subchannel or specified slot that is not used by the PSFCH including the short PSFCH format.

In aspect 12, the method of any of aspects 1-11 further includes that the ACK or the NACK is received in one RB and at least three (3) symbols in the PSFCH.

In aspect 13, the method of any of aspects 1-12 further includes that the ACK or the NACK is received in multiple RBs and at least three (3) symbols for each RB in the PSFCH.

In aspect 14, the method of any of aspects 1-13 further comprises receiving at least one of a CSI report or a scheduling request in the PSFCH.

In aspect 15, the method of any of aspects 1-14 further includes that the ACK or the NACK is received in the PSFCH including a long PSFCH format or in a PSFCH including a short PSFCH format, or the ACK or the NACK is received based on at least one of a priority, a MCS, a QoS, or a slot aggregation associated with the at least one sidelink channel.

In aspect 16, the method of any of aspects 1-15 further includes that the ACK or the NACK is received after a time gap and based on a periodicity of the PSFCH.

In aspect 17, the method of any of aspects 1-16 further includes that the ACK or the NACK is received in a last two symbols of the PSFCH including the long PSFCH format.

In aspect 18, the method of any of aspects 1-17 further includes that the ACK or the NACK is received in more than two symbols or all symbols of the PSFCH including the long PSFCH format when the second UE is configured to use a short PSFCH format.

In aspect 19, the method of any of aspects 1-18 further includes that the ACK or the NACK is received in one (1) or two (2) symbols, the ACK or the NACK corresponding to a HARQ repetition.

Aspect 20 is an apparatus for wireless communication including at least one processor coupled to a memory and configured to implement a method as in any of aspects 1 to 19.

Aspect 21 is an apparatus for wireless communication including means for implementing a method as in any of aspects 1 to 19.

Aspect 22 is a non-transitory computer-readable medium storing computer executable code, where the code when executed by a processor causes the processor to implement a method as in any of aspects 1 to 19.

Aspect 23 is a method of wireless communication of a first UE, comprising:
receiving, from a second UE, an indication to provide HARQ feedback for at least one sidelink channel; receiving, from the second UE, the at least one sidelink channel; and transmitting, to the second UE, an ACK or a NACK for the at least one sidelink channel via a PSFCH, the PSFCH including a long PSFCH format and associated with a sidelink resource pool.

In aspect 24, the method of aspect 23 further includes that the long PSFCH format includes a length of at least three (3) symbols.

In aspect 25, the method of aspect 23 or aspect 24 further includes that the at least one sidelink channel is a PSSCH or a PSCCH or both.

In aspect 26, the method of any of aspects 23-25 further includes that the indication is received via SCI in the PSCCH or the PSSCH.

In aspect 27, the method of any of aspects 23-26 further includes that the sidelink resource pool supports the long PSFCH format including a length of at least three (3) symbols and a short PSFCH format including a length of less than three (3) symbols.

In aspect 28, the method of any of aspects 23-27 further includes that the long PSFCH format is prioritized over the short PSFCH format when the PSFCH including the long PSFCH format and a PSFCH including the short PSFCH format are scheduled in a same slot in the sidelink resource pool.

In aspect 29, the method of any of aspects 23-28 further includes that the PSFCH including the long PSFCH format has a periodicity that is an integer multiple of the PSFCH including the short PSFCH format.

In aspect 30, the method of any of aspects 23-29 further includes that the PSFCH including the long PSFCH format is scheduled in one or more slots that are not occupied by the PSFCH including the short PSFCH format in the sidelink resource pool.

In aspect 31, the method of any of aspects 23-30 further includes that when the PSFCH including the long PSFCH format is scheduled in a same slot as the PSFCH including the short PSFCH format in the sidelink resource pool, the PSFCH with a longer periodicity is prioritized over the PSFCH with a shorter periodicity.

In aspect 32, the method of any of aspects 23-31 further includes that when the PSFCH including the long PSFCH format is scheduled in a same slot as the PSFCH including the short PSFCH format in the sidelink resource pool, the PSFCH with a configured repetition resources is prioritized over the PSFCH without configured repetition resources, where the configured repetition resources are in consecutive slots.

In aspect 33, the method of any of aspects 23-32 further includes that the PSFCH including the long PSFCH format is scheduled in at least one of specified subchannel or specified slot that is not used by the PSFCH including the short PSFCH format.

In aspect 34, the method of any of aspects 23-33 further includes that the ACK or the NACK is transmitted in one RB and at least three (3) symbols in the PSFCH.

In aspect 35, the method of any of aspects 23-34 further includes that the ACK or the NACK is transmitted in multiple RBs and at least three (3) symbols for each RB in the PSFCH.

In aspect 36, the method of any of aspects 23-35 further comprises: transmitting at least one of a CSI report or a scheduling request in the PSFCH.

In aspect 37, the method of any of aspects 23-36 further includes that the ACK or the NACK is transmitted in the PSFCH including a long PSFCH format or in a PSFCH including a short PSFCH format, or the ACK or the NACK is transmitted based on at least one of a priority, a MCS, a QoS, or a slot aggregation associated with the at least one sidelink channel.

In aspect 38, the method of any of aspects 23-37 further includes that the ACK or the NACK is transmitted after a time gap and based on a periodicity of the PSFCH.

In aspect 39, the method of any of aspects 23-38 further includes that the ACK or the NACK is transmitted in a last two symbols of the PSFCH including the long PSFCH format.

In aspect 40, the method of any of aspects 23-39 further includes that the ACK or the NACK is transmitted in more than two symbols or all symbols of the PSFCH including the long PSFCH format when the first UE is configured to use a short PSFCH format.

In aspect 41, the method of any of aspects 23-40 further includes that the ACK or the NACK is transmitted in one (1) or two (2) symbols, the ACK or the NACK corresponding to a HARQ repetition.

Aspect 42 is an apparatus for wireless communication including at least one processor coupled to a memory and configured to implement a method as in any of aspects 23 to 41.

Aspect 43 is an apparatus for wireless communication including means for implementing a method as in any of aspects 23 to 41.

Aspect 44 is a non-transitory computer-readable medium storing computer executable code, where the code when executed by a processor causes the processor to implement a method as in any of aspects 23 to 41.

What is claimed is:

1. A method of wireless communication at a first user equipment (UE), comprising:
transmitting, to a second UE, an indication to provide hybrid automatic repeat request (HARQ) feedback for at least one sidelink channel;
transmitting, to the second UE, at least one sidelink transmission via the at least one sidelink channel; and
receiving, from the second UE, an acknowledgement (ACK) or a negative-ACK (HACK) for the at least one sidelink transmission via a physical sidelink feedback channel (PSFCH), wherein the PSFCH includes a long PSFCH format and is associated with a sidelink resource pool that further supports a short PSFCH format, wherein the long PSFCH format includes a length of at least three (3) symbols and the short PSFCH format includes a length of less than three (3) symbols, wherein the long PSFCH format is prioritized over the short PSFCH format when the PSFCH including the long PSFCH format and a PSFCH including the short PSFCH format are scheduled in a same slot in the sidelink resource pool.

2. The method of claim 1, wherein the long PSFCH format includes a length of four symbols.

3. The method of claim 1, wherein the at least one sidelink channel is a physical sidelink shared channel (PSSCH) or a physical sidelink control channel (PSCCH) or both.

4. The method of claim 3, wherein the indication is transmitted via sidelink control information (SCI) in the PSCCH or the PSSCH.

5. The method of claim 1, wherein the PSFCH including the long PSFCH format has a periodicity that is an integer multiple of the PSFCH including the short PSFCH format.

6. The method of claim 1, wherein the PSFCH including the long PSFCH format is scheduled in one or more slots that are not occupied by the PSFCH including the short PSFCH format in the sidelink resource pool.

7. The method of claim 1, wherein when the PSFCH including the long PSFCH format is scheduled in a same slot as the PSFCH including the short PSFCH format in the sidelink resource pool, the PSFCH with a longer periodicity is prioritized over the PSFCH with a shorter periodicity.

8. The method of claim 1, wherein when the PSFCH including the long PSFCH format is scheduled in a same slot as the PSFCH including the short PSFCH format in the sidelink resource pool, the PSFCH with configured repetition resources is prioritized over the PSFCH without configured repetition resources, wherein the configured repetition resources are in consecutive slots.

9. The method of claim 1, wherein the PSFCH including the long PSFCH format is scheduled in at least one of specified subchannel or specified slot that is not used by the PSFCH including the short PSFCH format.

10. The method of claim 1, wherein the ACK or the NACK is received in one resource block (RB) and at least three (3) symbols in the PSFCH.

11. The method of claim 1, wherein the ACK or the NACK is received in multiple resource blocks (RBs) and at least three (3) symbols for each RB in the PSFCH.

12. The method of claim 1, further comprising:
receiving at least one of a channel state information (CSI) report or a scheduling request (SR) in the PSFCH.

13. The method of claim 1, wherein the ACK or the NACK is received in the PSFCH including a long PSFCH format or in a PSFCH including a short PSFCH format, or the ACK or the NACK is received based on at least one of a priority, a modulation and coding scheme (MCS), a quality of service (QoS), or a slot aggregation associated with the at least one sidelink channel.

14. The method of claim 1, wherein the ACK or the NACK is received after a time gap and based on a periodicity of the PSFCH.

15. The method of claim 1, wherein the ACK or the NACK is received in a last two symbols of the PSFCH including the long PSFCH format.

16. The method of claim 1, wherein the ACK or the NACK is received in more than two symbols or all symbols of the PSFCH including the long PSFCH format when the second UE is configured to use a short PSFCH format.

17. The method of claim 1, wherein the ACK or the NACK is received in one (1) or two (2) symbols, the ACK or the NACK corresponding to a HARQ repetition.

18. An apparatus for wireless communication of at a first user equipment (UE), comprising:
a memory; and
at least one processor coupled to the memory and configured to:
transmit, to a second UE, an indication to provide hybrid automatic repeat request (HARQ) feedback for at least one sidelink channel;
transmit, to the second UE, at least one sidelink transmission via the at least one sidelink channel; and
receive, from the second UE, an acknowledgement (ACK) or a negative-ACK (NACK) for the at least one sidelink transmission via a physical sidelink feedback channel (PSFCH), wherein the PSFCH includes a long PSFCH format and is associated with a sidelink resource pool that further supports a short PSFCH format, wherein the long PSFCH format includes a length of at least three (3) symbols and the short PSFCH format includes a length of less than three (3) symbols, wherein the long PSFCH format is prioritized over the short PSFCH format when the PSFCH including the long PSFCH format and a PSFCH including the short PSFCH format are scheduled in a same slot in the sidelink resource pool.

19. A method of wireless communication at a first user equipment (UE), comprising:
receiving, from a second UE, an indication to provide hybrid automatic repeat request (HARQ) feedback for at least one sidelink channel;
receiving, from the second UE, at least one sidelink transmission via the at least one sidelink channel; and
transmitting, to the second UE, an acknowledgement (ACK) or a negative-ACK (NACK) for the at least one sidelink transmission via a physical sidelink feedback channel (PSFCH), wherein the PSFCH includes a long PSFCH format and is associated with a sidelink resource pool that further supports a short PSFCH format, wherein the long PSFCH format includes a length of at least three (3) symbols and the short PSFCH format includes a length of less than three (3)

symbols, wherein the long PSFCH format is prioritized over the short PSFCH format when the PSFCH including the long PSFCH format and a PSFCH including the short PSFCH format are scheduled in a same slot in the sidelink resource pool.

20. The method of claim 19, wherein the long PSFCH format includes a length of four (4) symbols.

21. The method of claim 19, wherein the PSFCH including the long PSFCH format has a periodicity that is an integer multiple of the PSFCH including the short PSFCH format.

22. The method of claim 19, wherein when the PSFCH including the long PSFCH format is scheduled in a same slot as the PSFCH including the short PSFCH format in the sidelink resource pool, the PSFCH with configured repetition resources is prioritized over the PSFCH without configured repetition resources, wherein the configured repetition resources are in consecutive slots.

23. The method of claim 19, wherein the PSFCH including the long PSFCH format is scheduled in one or more slots that are not occupied by the PSFCH including the short PSFCH format in the sidelink resource pool.

24. The method of claim 19, wherein when the PSFCH including the long PSFCH format is scheduled in a same slot as the PSFCH including the short PSFCH format in the sidelink resource pool, the PSFCH with a longer periodicity is prioritized over the PSFCH with a shorter periodicity.

25. The method of claim 19, wherein the ACK or the NACK is transmitted in the PSFCH including the long PSFCH format or in a PSFCH including a short PSFCH format, or the ACK or the NACK is transmitted based on at least one of a priority, a modulation and coding scheme (MCS), a quality of service (QoS), or a slot aggregation associated with the at least one sidelink channel.

26. The method of claim 19, wherein the ACK or the NACK is transmitted after a time gap and based on a periodicity of the PSFCH.

27. The method of claim 19, wherein the ACK or the NACK is transmitted in more than two symbols or all symbols of the PSFCH including the long PSFCH format when the first UE is configured to use a short PSFCH format.

28. An apparatus for wireless communication at a first user equipment (UE), comprising:
a memory; and
at least one processor coupled to the memory and configured to:
receive, from a second UE, an indication to provide hybrid automatic repeat request (HARQ) feedback for at least one sidelink channel;
receive, from the second UE, at least one sidelink transmission via the at least one sidelink channel; and
transmit, to the second UE, an acknowledgement (ACK) or a negative-ACK (NACK) for the at least one sidelink transmission via a physical sidelink feedback channel (PSFCH), wherein the PSFCH includes a long PSFCH format and is associated with a sidelink resource pool that further supports a short PSFCH format, wherein the long PSFCH format includes a length of at least three (3) symbols and the short PSFCH format includes a length of less than three (3) symbols, wherein the long PSFCH format is prioritized over the short PSFCH format when the PSFCH including the long PSFCH format and a PSFCH including the short PSFCH format are scheduled in a same slot in the sidelink resource pool.

* * * * *